United States Patent
Ishibashi

(10) Patent No.: US 8,970,772 B2
(45) Date of Patent: Mar. 3, 2015

(54) DIGITAL PHOTOGRAPHING APPARATUS

(75) Inventor: Kenji Ishibashi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 142 days.

(21) Appl. No.: 13/370,548

(22) Filed: Feb. 10, 2012

(65) Prior Publication Data

US 2012/0320256 A1 Dec. 20, 2012

(30) Foreign Application Priority Data

Jun. 14, 2011 (KR) ........................ 10-2011-0057599

(51) Int. Cl.
*H04N 5/232* (2006.01)
*G03B 17/14* (2006.01)

(52) U.S. Cl.
CPC ............ *G03B 17/14* (2013.01); *H04N 5/23209* (2013.01); *H04N 5/23212* (2013.01); *H04N 5/23241* (2013.01); *H04N 5/23296* (2013.01); *G03B 2217/007* (2013.01)
USPC .......................................... 348/347; 348/345

(58) Field of Classification Search
CPC ........... H04N 5/23212; H04N 5/23219; G02B 7/102; G02B 7/28; G03B 13/36
USPC ....................................... 348/347
See application file for complete search history.

(56) References Cited

U.S. PATENT DOCUMENTS

| 5,404,191 | A | | 4/1995 | Kashiyama et al. |
| 5,664,234 | A | | 9/1997 | Kawasaki et al. |
| 6,041,189 | A | * | 3/2000 | Izukawa ........................ 396/277 |
| 2009/0154915 | A1 | * | 6/2009 | Hasuda .......................... 396/535 |
| 2010/0238321 | A1 | * | 9/2010 | Honjo et al. ............. 348/231.99 |
| 2011/0080488 | A1 | * | 4/2011 | Okamoto et al. .......... 348/220.1 |
| 2011/0292270 | A1 | * | 12/2011 | Nakamura .................... 348/335 |

FOREIGN PATENT DOCUMENTS

| JP | 05-203868 A | 8/1993 |
| JP | 2794631 B2 | 9/1998 |
| JP | 2002-131616 A | 5/2002 |

* cited by examiner

*Primary Examiner* — Twyler Haskins
*Assistant Examiner* — Fayez Bhuiyan
(74) *Attorney, Agent, or Firm* — Drinker Biddle & Reath LLP

(57) ABSTRACT

A digital photographing apparatus includes an exchangeable lens and a body unit to which the exchangeable lens is installed. The exchangeable lens includes a plurality of actuators and a storage unit that stores power consumption information related to driving of the plurality of actuators. The body unit includes an actuator controller that controls the driving of the plurality of actuators based on the power consumption information. Accordingly, the plurality of actuators included in the exchangeable lens may be stably controlled.

16 Claims, 34 Drawing Sheets

FIG. 12

| Focus Speed | |
|---|---|
| FS1 | 2000 |
| FS2 | 2500 |
| FS3 | 3000 |
| FS4 | 3500 |
| FS5 | 4000 |
| FS6 | 4500 |
| FS7 | 5000 |
| FS8 | 5500 |
| FS9 | 6000 |
| FS10 | 6500 |

| Focus Sensitivity | |
|---|---|
| Z1 | 0.16 |
| Z2 | 0.15 |
| Z3 | 0.14 |
| Z4 | 0.13 |
| Z5 | 0.12 |
| Z6 | 0.11 |
| Z7 | 0.10 |
| Z8 | 0.09 |

| Backlash | |
|---|---|
| BL | 30 |

| Actuator | |
|---|---|
| DC | 0 |
| Step | 1 |
| US | 0 |
| VC | 0 |

| Lens Power | |
|---|---|
| Lens Power | 0 |

| Open Iris | |
|---|---|
| Z1 | 2.82 |
| Z2 | 2.9 |
| Z3 | 2.98 |
| Z4 | 3.06 |
| Z5 | 3.16 |
| Z6 | 3.26 |
| Z7 | 3.36 |
| Z8 | 3.5 |

| Focus Length | |
|---|---|
| Z1 | 28.0 |
| Z2 | 33.8 |
| Z3 | 40.9 |
| Z4 | 49.4 |
| Z5 | 59.6 |
| Z6 | 72.0 |
| Z7 | 87.0 |
| Z8 | 105.1 |

DIGITAL PHOTOGRAPHING APPARATUS

CROSS-REFERENCE TO RELATED PATENT APPLICATION

This application claims the priority benefit of Korean Patent Application No. 10-2011-0057599, filed on Jun. 14, 2011, in the Korean Intellectual Property Office, the disclosure of which is incorporated herein in its entirety by reference.

BACKGROUND

1. Field

Embodiments relate to a digital photographing apparatus.

2. Description of the Related Art

Digital photographing apparatuses, such as cameras, camcorders, etc., may perform a zoom operation so as to enlarge a distant subject, and may adjust a focus to capture a clear still image or moving image. Also, the digital photographing apparatuses may drive a zoom lens, a focus lens, an iris, a shutter, etc., so as to perform various functions, and require a predetermined power to drive each element.

SUMMARY

Embodiments include a digital photographing apparatus that stably controls a plurality of actuators included in an exchangeable lens according to power consumed in the exchangeable lens.

According to an embodiment, a digital photographing apparatus includes: an exchangeable lens including a plurality of actuators and a storage unit that stores power consumption information related to driving of the plurality of actuators; and a body unit to which the exchangeable lens is installed, and including an actuator controller that controls the driving of the plurality of actuators based on the power consumption information.

The actuator controller may permit the driving of the plurality of actuators if the power consumption information is below a base value.

The actuator controller may prohibit two or more actuators from among the plurality of actuators from being simultaneously driven if the power consumption information is equal to or above a base value.

The plurality of actuators may include a zoom lens driving actuator, a focus lens driving actuator, and an iris driving actuator. The body unit may further include a shutter button that directs starting of a release operation. The actuator controller may prohibit driving of the zoom lens driving actuator while the shutter button is being manipulated, if the power consumption information is equal to or above a base value.

The plurality of actuators may include at least one of a zoom lens driving actuator, a focus lens driving actuator, and an iris driving actuator.

The exchangeable lens may further include a communicator that transmits the power consumption information to the actuator controller.

According to another embodiment, a digital photographing apparatus includes: an exchangeable lens including a plurality of actuators and an actuator controller that controls driving of the plurality of actuators; and a body unit to which the exchangeable lens is installed. The body unit includes a storage unit that stores power supply information supplied to the exchangeable lens, wherein the actuator controller controls the driving of the plurality of actuators based on the power supply information.

The actuator controller may permit the driving of the plurality of actuators if the power supply information is equal to or above a base value.

The actuator controller may prohibit two or more actuators from among the plurality of actuators from being simultaneously driven if the power supply information is below a base value.

The plurality of actuators may include a zoom lens driving actuator, a focus lens driving actuator, and an iris driving actuator. The body unit may further include a shutter button that directs starting of a release operation, and the actuator controller may prohibit driving of the zoom lens driving actuator while the shutter button is being manipulated, if the power consumption information is below a base value.

The plurality of actuators may include at least one of a zoom lens driving actuator, a focus lens driving actuator, and an iris driving actuator.

The body unit may further include a communicator that transmits the power supply information to the actuator controller.

According to another embodiment, a digital photographing apparatus includes: a plurality of actuators; a first storage unit that stores power consumption information related to driving of the plurality of actuators; a power controller that supplies power to the plurality of actuators; a second storage unit that stores power supply information related to power supplied to the plurality of actuators; and an actuator controller that controls the driving of the plurality of actuators based on the power consumption information and the power supply information.

The digital photographing apparatus may further include an exchangeable lens and a body unit to which the exchangeable lens is installed, wherein the exchangeable lens may include the plurality of actuators and the first storage unit, and the body unit may include the power controller, the second storage unit, and the actuator controller.

The digital photographing apparatus may further include an exchangeable lens and a body unit to which the exchangeable lens is installed, wherein the exchangeable lens may include the plurality of actuators, the first storage unit, and the actuator controller, and the body unit may include the power controller and the second storage unit.

The actuator controller may permit driving of the plurality of actuators if the power consumption information is below power supply information.

The actuator controller may prohibit two or more actuators from among the plurality of actuators from being simultaneously driven if the power consumption information is equal to or above the power supply information.

The digital photographing apparatus may further include a shutter button that directs starting of a release operation, wherein the plurality of actuators may include a zoom lens driving actuator, a focus lens driving actuator, and an iris driving actuator, and the actuator controller may prohibit driving of the zoom lens driving actuator while the shutter button is being manipulated, if the power consumption information is equal to or above the power supply information.

BRIEF DESCRIPTION OF THE DRAWINGS

The above and other features and advantages will become more apparent by describing in detail exemplary embodiments with reference to the attached drawings in which:

FIG. 12 is a set of tables showing lens data, according to an embodiment;

DETAILED DESCRIPTION

Figure 1:
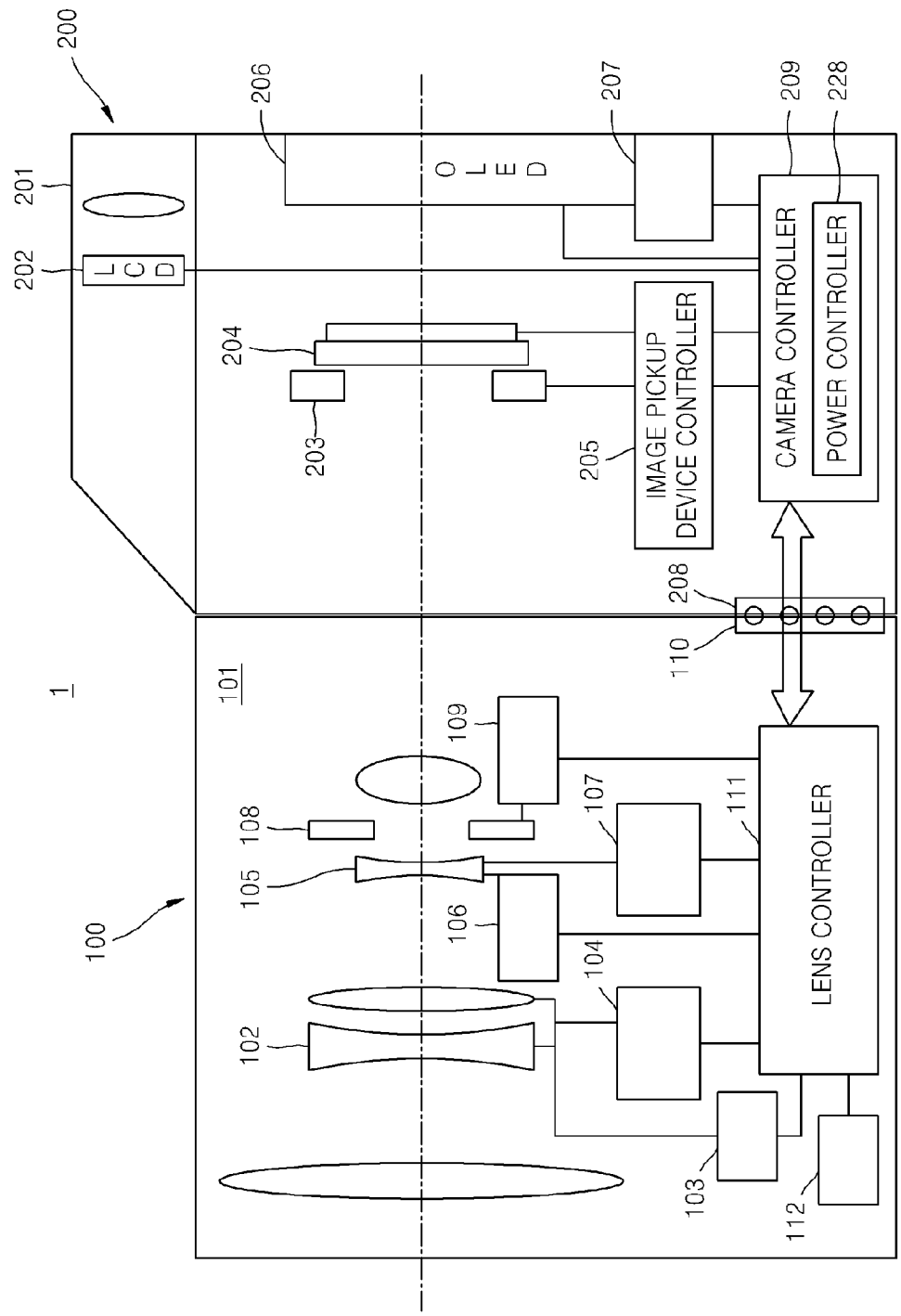
FIG. 1 is a diagram of a digital photographing apparatus, according to an embodiment.

Hereinafter, embodiments will be described more fully with reference to the accompanying drawings, in which exemplary embodiments are shown. The embodiments set forth herein should not be construed as being limiting; rather, these embodiments are provided so that this disclosure will be thorough and complete, and will fully convey inventive concepts to those skilled in the art. In the drawings, like reference numerals denote like elements. Also, detailed descriptions about related well-known functions or configurations that may diminish the clarity of the points of the embodiments are omitted.

FIG. 1 is a diagram of a digital photographing apparatus 1, according to an embodiment.

Referring to FIG. 1, the digital photographing apparatus 1 according to the current embodiment includes an exchangeable lens (hereinafter, referred to as a lens) 100 and a body unit 200. The lens 100 has a focus detecting function and the body unit 200 has a function for driving a zoom lens 102 and a focus lens 105 by controlling the lens 100.

The lens 100 includes an image forming optical system 101, a zoom lens driving actuator 103, a zoom lens location detecting sensor 104, a focus lens driving actuator 106, a focus lens location detecting sensor 107, an iris driving actuator 109, a lens mount 110, a lens controller 111, and a lens manipulator 112.

The image forming optical system 101 includes the zoom lens 102 for adjusting a zoom, the focus lens 105 for changing a focus location, and an iris 108. The zoom lens 102 and the focus lens 105 may each be a lens group in which a plurality of lenses are combined.

The zoom lens location detecting sensor 104 and the focus lens location detecting sensor 107 respectively detect locations of the zoom lens 102 and the focus lens 105. A timing of detecting the location of the focus lens 105 may be set by the lens controller 111 or a camera controller 209 to be described later. For example, the timing of detecting the location of the focus lens 105 may be a timing of performing auto focus (AF) detection using an image signal.

The zoom lens driving actuator 103, the focus lens driving actuator 106, and the iris driving actuator 109 are controlled by the lens controller 111, and respectively drive the zoom lens 102, the focus lens 105, and the iris 108.

The lens controller 111 controls overall operations of each element included in the lens 100. The lens controller 111 transmits information about the detected location of the focus lens 105 to the body unit 200. Here, the lens controller 111 may transmit the information about the detected location of the focus lens 105 to the body unit 200 when the location of the focus lens 105 is changed or when the camera controller 209 requests information about the location of the focus lens 105.

The lens controller 111 may perform a power zoom operation, an AF operation, and a varifocal compensation operation by controlling each actuator according to control of the body unit 200. In other words, the lens controller 111 may be an example of an actuator controller.

If the lens controller 111 performs functions of an actuator controller, the lens controller 111 may receive body data including power supply information about supplied power from the body unit 200, and determine driving or stopping of each actuator according to the received power supply information. However, the functions of the actuator controller may not be performed only by the lens controller 111. For example, the lens controller 111 may transmit power consumption information of the lens 100 to the camera controller 209, and the camera controller 209 may perform the functions of the actuator controller for determining driving or stopping of each actuator.

Also, the lens controller 111 may include a storage unit for storing data, and the storage unit may store various pieces of information, such as lens data.

The lens mount 110 includes a lens communication pin, and is used as a transmission path for data, a control signal, or the like by being linked to a camera communication pin that will be described later.

The lens manipulator 112 is a manipulator for performing a power zoom operation or a power focus operation. The lens manipulator 112 is connected to the lens controller 111 to apply a manipulator signal from a user to the lens controller 111.

A structure of the body unit 200 will now be described in detail.

The body unit 200 includes an electronic view finder (EVF) 201, a shutter 203, an image pickup device 204, an image pickup device controller 205, a display unit 206, a manipulation button 207, the camera controller 209, and a camera mount 208.

The EVF 201 may include a liquid crystal display unit 202, and a user may view an image being captured in real time via the EVF 201.

The shutter 203 determines a duration in which light is applied to the image pickup device 204, i.e., an exposure time.

The image pickup device 204 generates an image signal by capturing image light passed through the image forming optical system 101 of the lens 100. The image pickup device 204 may include a plurality of photoelectric transformation units arranged in a matrix form, and at least one of vertical and horizontal transmission paths for reading the generated image signal by transferring electric charges from the photoelectric transformation units. A charge coupled device (CCD) sensor, a complementary metal oxide semiconductor (CMOS) sensor, or the like may be used as the image pickup device 204.

The image pickup device controller 205 generates a timing signal, and controls the image pickup device 204 to capture an image in synchronization with the timing signal. Also, the image pickup device controller 205 sequentially reads horizontal image signals after accumulation of electric charges is completed in each of scanning lines. The read horizontal image signals are used for the AF detection in the camera controller 209.

The display unit 206 displays various images and information. An organic light emitting display (OLED) or a liquid crystal display (LCD) may be used as the display unit 206.

The user inputs various commands to the manipulation button 207 so as to manipulate the digital photographing apparatus 1. The manipulation button 207 may include various buttons, such as a shutter release button, a main switch, a mode dial, and a menu button.

The camera controller 209 calculates a contrast value by performing the AF detection on the image signal generated by the image pickup device 204. Also, the camera controller 209 stores a contrast value at each of AF detecting points of time according to the timing signal generated by the image pickup device controller 205, and calculates the focus location by using the information about the focus lens 105 received from the lens 100 and the stored contrast value. The calculated focus location is transmitted to the lens 100.

The camera controller 209 may direct driving of the shutter 203, the iris 108, or the like according to a release start request from the manipulation button 207.

Also, the camera controller 209 transmits a command signal enabling the lens controller 111 to control each actuator to the lens 100. In other words, the camera controller 209 may be an example of an actuator controller.

If the camera controller 209 performs functions of an actuator controller, the camera controller 209 may receive lens data including power consumption information about power consumed when the lens 100 operates from the lens 100, and generate a command signal directing to drive or stop each actuator according to the received power consumption information. However, the functions of the actuator controller may not be performed only by the camera controller 209. For example, the camera controller 209 may transmit power supply information of the body unit 200 to the lens controller 111, and the lens controller 111 may perform the functions of the actuator controller for determining driving or stopping of each actuator.

Also, the camera controller 209 may include a storage unit for storing data, and the storage unit may store the body data including the power supply information about the power supplied to the lens 100.

The camera mount 208 includes a camera communication pin. Also, power may be supplied to the lens controller 111 through the camera mount 208.

Schematic operations of the lens 100 and the body unit 200 will now be described.

When a subject is to be photographed, an operation of the digital photographing apparatus 1 starts by manipulating the main switch included in the manipulation button 207. The digital photographing apparatus 1 first displays a live view as follows.

Image light of the subject passes through the image forming optical system 101 and is incident on the image pickup device 204. At this time, the shutter 203 is in an open state. The incident image light is converted into an electric signal by the image pickup device 204, and thus an image signal is generated. The image pickup device 204 operates according to a timing signal generated by the image pickup device controller 205. The generated image signal is converted into data displayable by the camera controller 209, and is output to the EVF 201 and the display unit 206. Such an operation is called a live view display, and a live view image displayed according to the live view display is a moving image that is continuously displayed.

After the live view display, the digital photographing apparatus 1 starts an AF operation when the shutter release button, which is one of the manipulation button 207, is half-pressed. The AF operation is performed by using the image signal generated by the image pickup device 204. According to a contrast AF method, a focus location is calculated from a contrast value, and the lens 100 is driven based on the calculated focus location. The contrast value is calculated by the camera controller 209. The camera controller 209 calculates information for controlling the focus lens 105 from the contrast value, and transmits the calculated information to the lens controller 111 through the lens communication pin and the camera communication pin respectively included in the lens mount 110 and the camera mount 208.

The lens controller 111 performs the AF operation by driving the focus lens 105 in the optical axis direction by controlling the focus lens driving actuator 106 based on the received information. The location of the focus lens 105 is monitored by the focus lens location detecting sensor 107 and fed back to the camera controller 209.

When the zoom lens 102 is manipulated by the user to perform a zoom operation, the zoom lens location detecting sensor 104 detects the location of the zoom lens 102, and the lens controller 111 changes AF control parameters of the focus lens 105 to perform the AF operation again.

When a focus on the subject is adjusted through the above operations, the shutter release button is completely pressed and thus the digital photographing apparatus 1 performs light exposure. Here, the camera controller 209 first completely closes the shutter 203, and then transmits light measurement information obtained thus far to the lens controller 111 as iris control information. The lens controller 111 controls the iris driving actuator 109 based on the iris control information, and adjusts the iris 108 to have a suitable iris value. The camera controller 209 controls the shutter 203 based on the light measurement information, and captures an image of the subject by opening the shutter 203 for a suitable exposure time.

Figure 2:
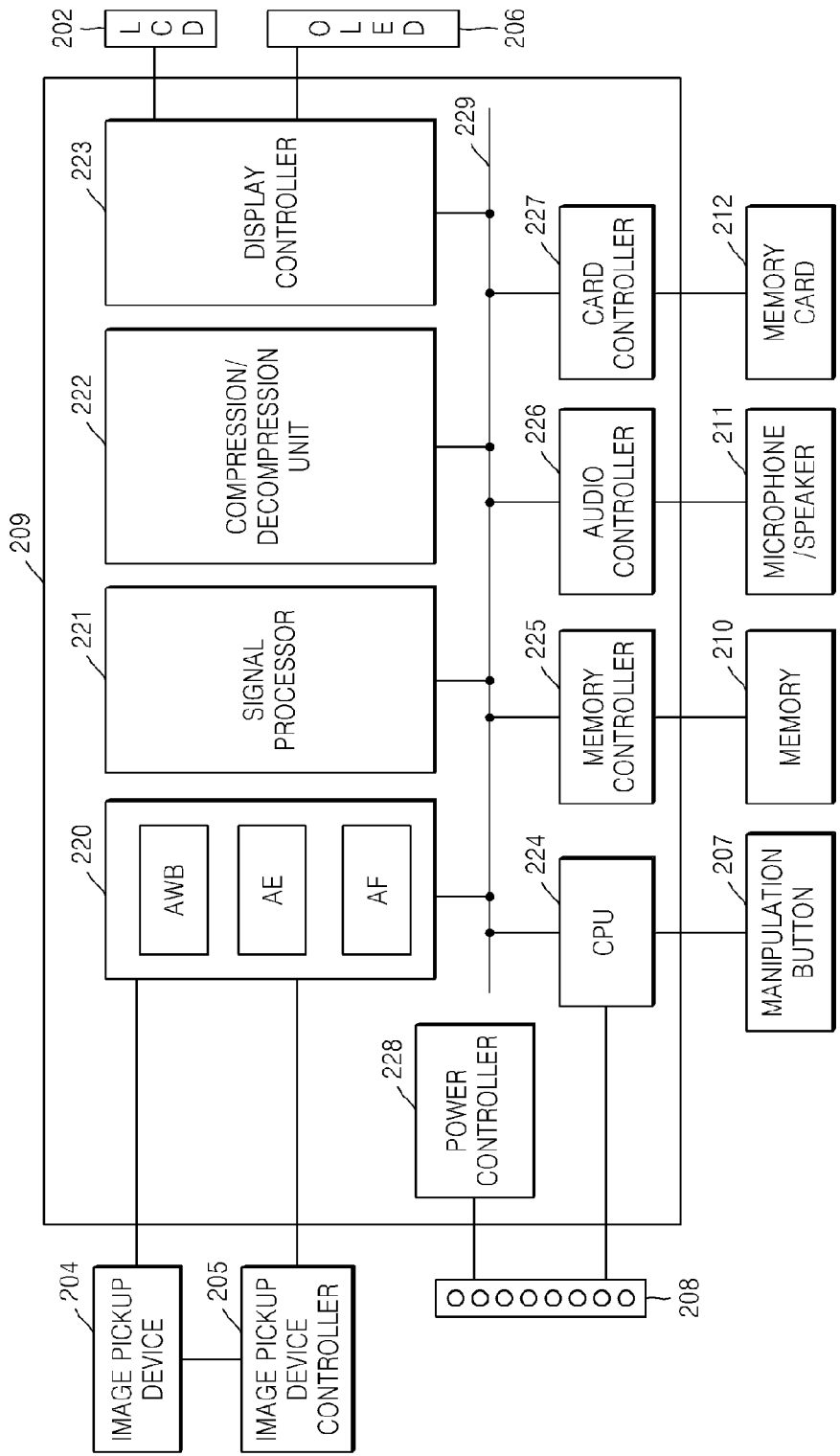
FIG. 2 is a diagram of a camera controller of the digital photographing apparatus of FIG. 1, according to an embodiment.

An image signal process and a compression process are performed on the captured image, and the processed image is stored in a memory card 212 (see FIG. 2). At the same time, a captured image is output to the EVF 201 and the display unit 206, where the subject is displayed. Such a captured image is referred to as a quick view image.

Thus, the series of photographing operations are completed as described above.

FIG. 2 is a diagram of the camera controller 209 of the digital photographing apparatus 1 of FIG. 1, according to an embodiment.

Referring to FIG. 2, the camera controller 209 according to the current embodiment may include a pre-processor 220, a signal processor 221, a compression/decompression unit 222, a display controller 223, a central processing unit (CPU) 224, a memory controller 225, an audio controller 226, a card controller 227, a power controller 228, and a main bus 229.

The camera controller 209 transmits various directions and data to corresponding elements through the main bus 229.

The pre-processor 220 performs an auto white balance (AWB) operation, an auto exposure (AE) operation, and an AF operation by receiving an image signal generated by the image pickup device 204. In other words, a contrast value for adjusting a focus, an AE evaluation value for adjusting exposure, and an AWB evaluation value for adjusting white balance are calculated.

The signal processor 221 performs a series of image signal processes, such as gamma correction, on the image signal generated by the image pickup device 204 so as to prepare a live view image or a captured image displayable on the display unit 206.

The compression/decompression unit 222 performs compression and decompression on the image signal on which the image signal processes have been performed. According to the compression, for example, an image signal is compressed in a compression format, such as a JPEG compression format or an H.264 compression format. An image file including image data generated via the compression is transmitted to and stored in the memory card 212.

The display controller 223 controls image output to a display screen, such as the liquid crystal display unit 202 of the EVF 201 or the display unit 206.

The CPU 224 controls overall operations of each element. Also, according to the digital photographing apparatus 1 of FIG. 1, the CPU 224 communicates with the lens 100.

The memory controller 225 controls a memory 210 for temporarily storing data, such as the captured image or image related information, and the audio controller 226 controls a microphone or speaker 211. Also, the card controller 227 controls the memory card 212 for storing the captured image.

The power controller 228 controls power consumption of the digital photographing apparatus 1 and power supply to the lens 100.

FIGS. 3A, 3B, 3C, and 3D are graphs for describing an AF operation in a contrast AF method. In the contrast AF method, the AF operation is performed by detecting a location of a focus lens, where a contrast value of a subject is maximum, as a focus location. In FIGS. 3A through 3D, a horizontal axis denotes a location of a focus lens, and a vertical axis denotes a contrast value.

Figure 3A:
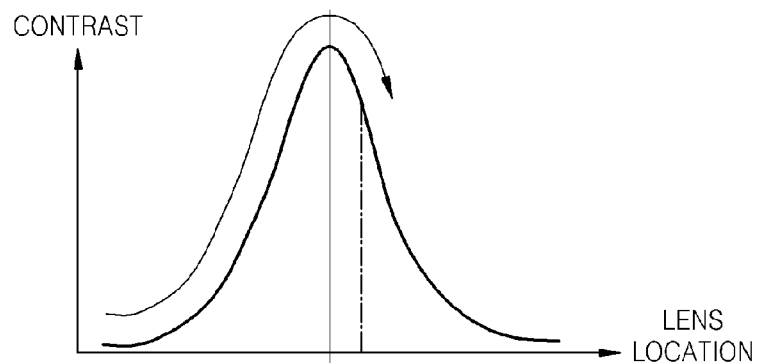
FIGS. 3A, 3B, 3C, and 3D are graphs for describing an auto focus (AF) operation in a contrast AF method.

In FIG. 3A, a peak of a contrast value is detected by driving a focus lens in one direction at a high speed from a state where a contrast value is low as a subject is out of focus.

Figure 3B:
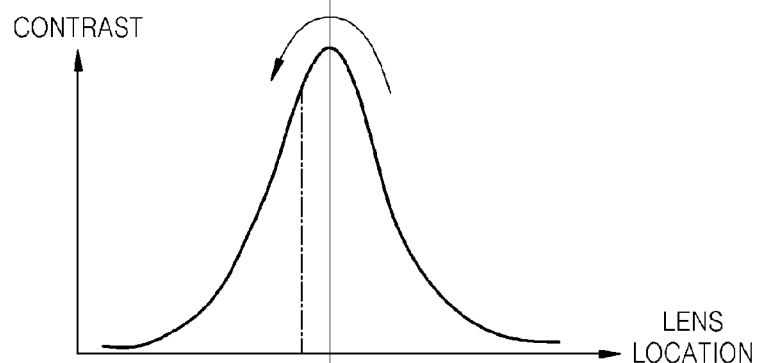

In FIG. 3B, the lens driving direction is reversed, and the peak is detected again by driving the focus lens at a low speed compared to the high speed of FIG. 3A. Accordingly, the AF operation may be performed precisely.

Figure 3C:
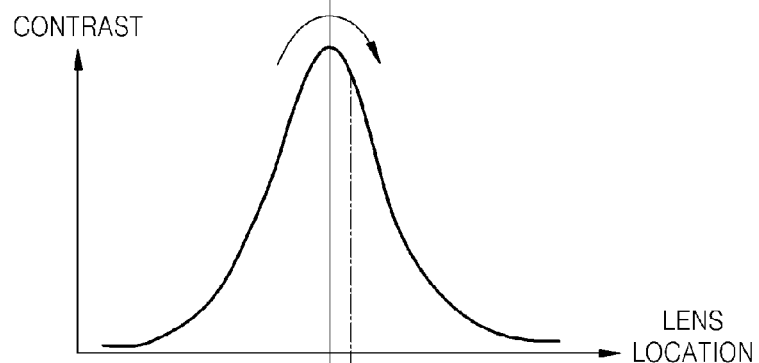

In FIG. 3C, the focus lens is driven toward a focus location according to the detected peak. However, a device for driving a lens generally has backlash, and an error may be generated in a lens location according to a driven direction. Accordingly, the focus lens is driven to pass through the focus location in FIG. 3C in order to allow for removal of the error.

Figure 3D:
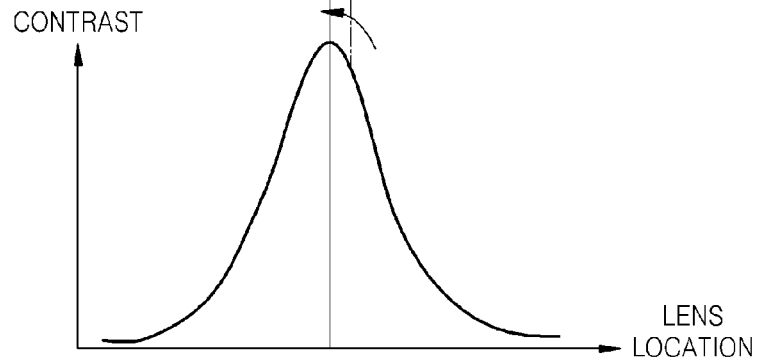

In FIG. 3D, the lens driving direction is again reversed and thus the focus lens is driven in the same direction as in FIG. 3B where the focus location is finally determined, and the focus lens is stopped at the focus location.

Thus, the AF operation is performed as described above.

An operation of photographing a subject according to the AF operation will now be described in detail.

Figure 4:
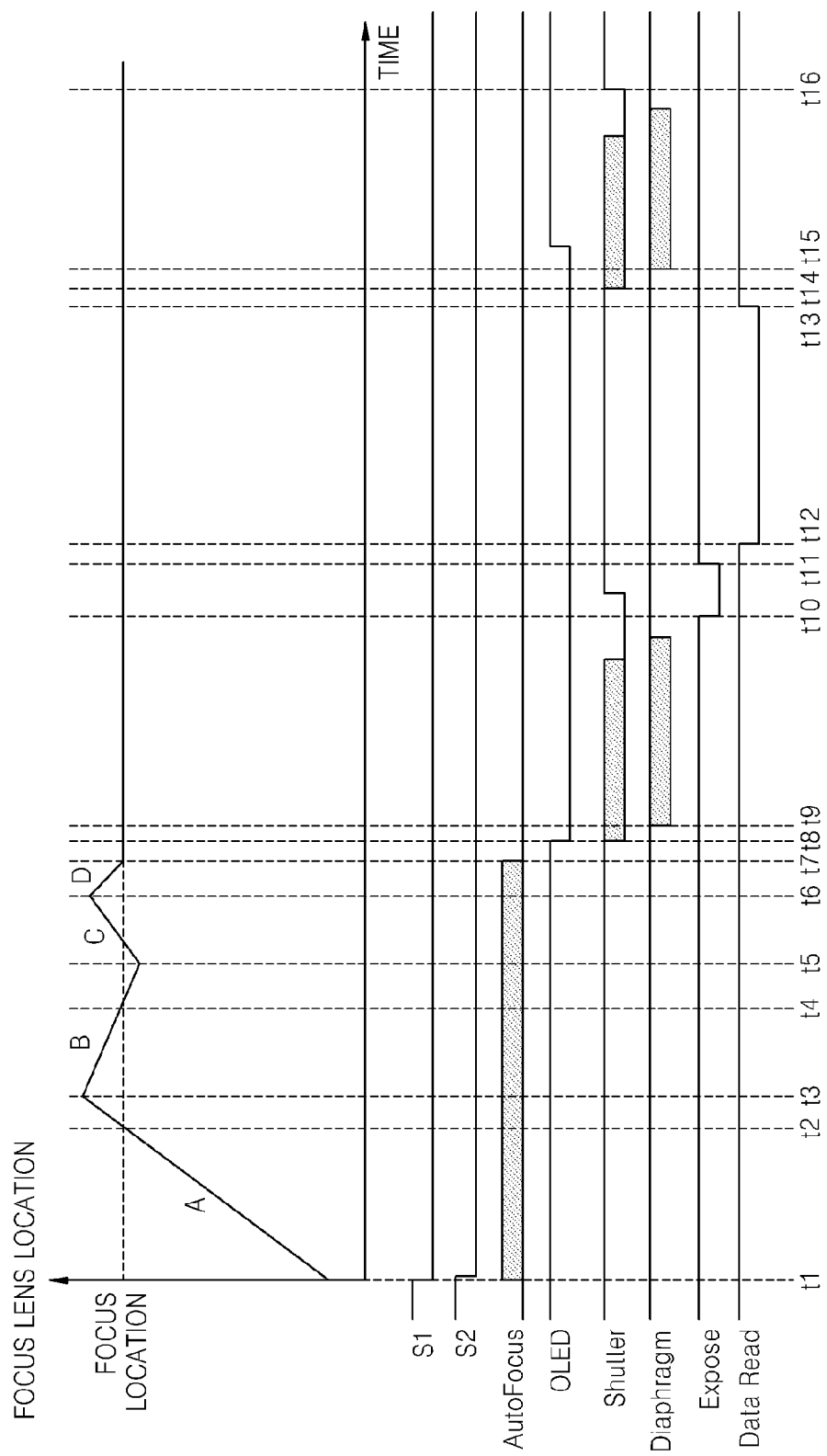
FIG. 4 is a timing diagram showing a general photographing method.

FIG. 4 is a timing diagram showing a general photographing method.

In FIG. 4, a horizontal axis denotes time, and a vertical axis denotes a location of a focus lens. S1 and S2 respectively denote a photographing operation start signal and a release start signal received from a user. Auto Focus denotes a driven state of the focus lens, and the focus lens is driven in a gray portion. OLED denotes a state of the display unit 206. When the OLED is in a high level, an image of a subject is displayed on the display unit 206, and when the OLED is in a low level, a black screen is displayed on the display unit 206. Shutter denotes a driven state of a shutter driving actuator (not shown) for opening or shutting the shutter 203, and the shutter 203 is driven in gray portions. Also, a low level denotes a break state (pause state) and a high level denotes an off state. Diaphragm denotes a driven state of the iris 108, and the iris 108 is driven in gray portions. Expose denotes a timing when the subject image is exposed on the image pickup device 204, which begins when the shutter 203 is actually opened. Data Read denotes a timing when an image signal of the image pickup device 204 is recorded in a storage medium, while the Data Read is in a low level.

Referring to FIG. 4, the AF operation starts when S1 is applied according to manipulation by the user at a time t1. First, as described with reference to FIGS. 3A through 3D, an operation A for detecting a peak of a contrast value at a high speed is performed. Since a peak location needs to be passed to detect the peak of the contrast value at a time t2, a driven direction of a lens is reversed at a time t3 when the peak location is passed by a predetermined distance. Then an operation B for precisely detecting the peak location is performed. Similarly, the peak location is detected at a time t4, and the driven direction of the lens is reversed at a time t5 when the peak location is passed by a predetermined distance. At the time t5, a focus location is determined to be the peak location detected at the time t4. An operation C is performed toward the focus location, and an operation D is performed by reversing the driven direction of the lens again so as to correct a backlash at the time t6.

When a level of S2 is low at a time t7 when the operation D is completed (when the user requests release), a release operation starts. First, the shutter 203 is changed from an opened state to a closed state by a shutter actuator (not shown). A direct current (DC) motor may be used to drive the shutter 203, and a high current flows when the DC motor starts to drive the shutter 203. Accordingly, at a time t9 after a predetermined time has passed after starting the driving of the shutter 203, for example, after 15 ms, the iris 108 starts to be driven. The iris 108 is driven by transmitting a command from the body unit 200 to the lens 100 through the communication pin of the lens mount 110. The shutter 203 is driven for a predetermined time, for example, 40 ms, and then enters into a break state (pause state). An iris value of the iris 108 changes according to luminance of the subject. However, the iris 108 is driven for a predetermined time, for example, within 70 ms.

After the driving of the shutter 203 and iris 108 is completed, a light exposure operation starts at a time t10. The shutter 203 is closed after a time set according to a set shutter speed, and thus the light exposure operation is completed at a time t11.

When the light exposure operation is completed, data is read from the image pickup device 204 at a time t12. When the data is completely read at a time t13 after a predetermined time, for example, after 110 ms, the shutter 203 starts to be driven at a time t14 so as to open the shutter 203 for following photographing. Here, as described above, the iris 108 is driven to be opened at a time t15 after a predetermined time has passed, due to a driving current of the shutter actuator.

Figure 5:
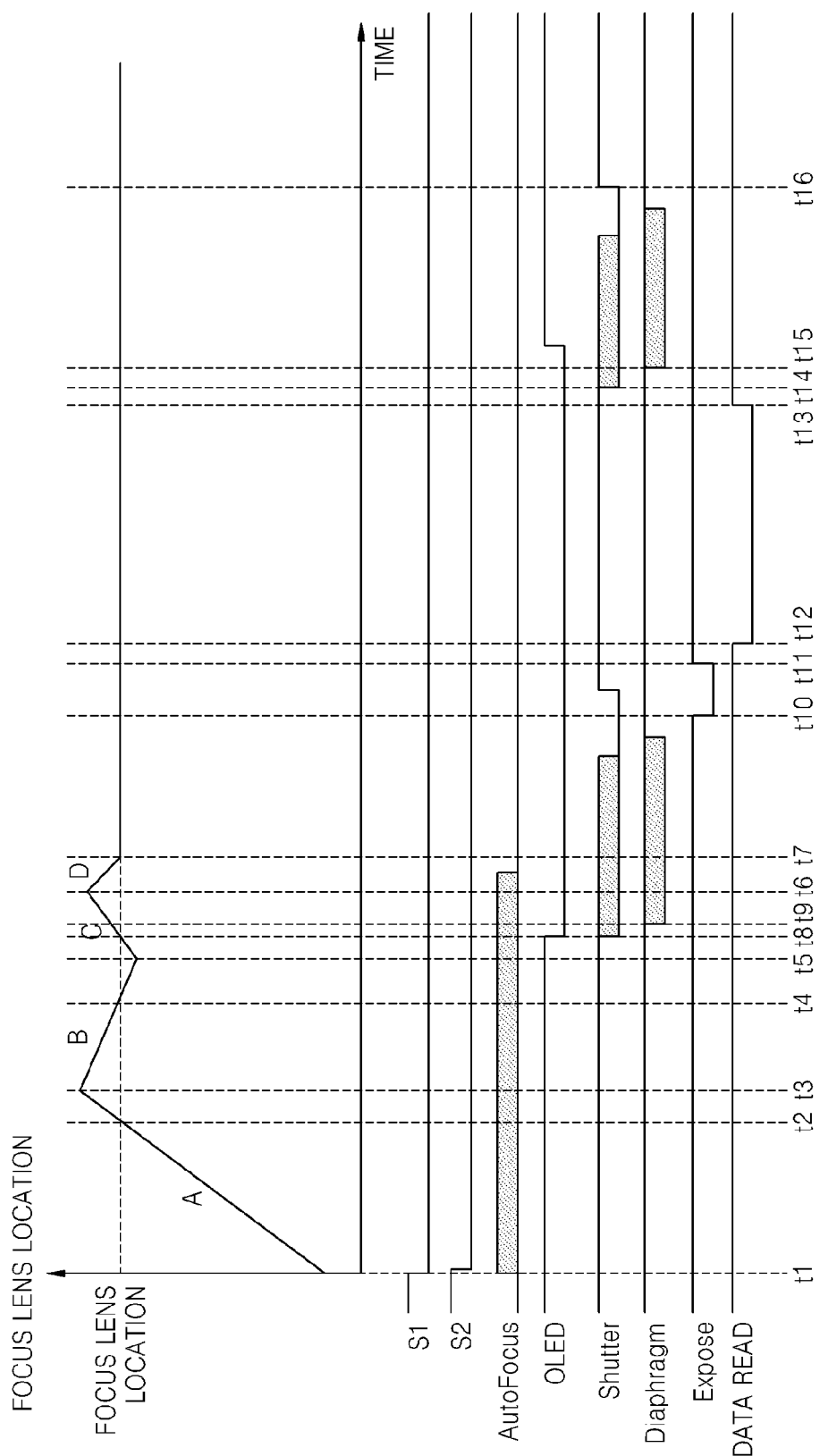
FIG. 5 is a timing diagram showing a photographing method, according to an embodiment.

FIG. 5 is a timing diagram showing a photographing method, according to an embodiment. FIG. 5 is a timing diagram showing driving of the focus lens 105, i.e., when the AF operation is performed.

Referring to FIG. 5, operations at times t1 through t5 are identical to those of FIG. 4.

Since a focus location is determined at the time t5, driving amounts in operations C and D may also be determined. Times required to perform the operations C and D are calculated according to the driving amounts and driving speeds, and if the operations C and D are operable up to a time t10 when light exposure starts, a release operation starts at the same time as with the operations C and D constituting the AF operation from the time t5. Here, since operations at times t6 through t16 are identical to those of FIG. 4, details thereof will be omitted herein.

As shown in FIG. 5, the focus lens 105 is driven during the release operation in the current embodiment. When compared with FIG. 4, an interval from the time t5 when the operation B ends to the time t10 when the light exposure starts is clearly reduced in FIG. 5.

However, the photographing method is not limited thereto. In other words, a photographing time may be reduced by starting the release operation whenever before the AF operation is completed after a focus location is determined, if the release operation can be completed before completing the AF operation.

However, in order to simultaneously perform the AF operation and the release operation as described above, power supplied from the body unit 200 to the lens 100 or power required to drive actuators included in the lens 100 needs to be considered. This will be described in detail later.

Figure 6:
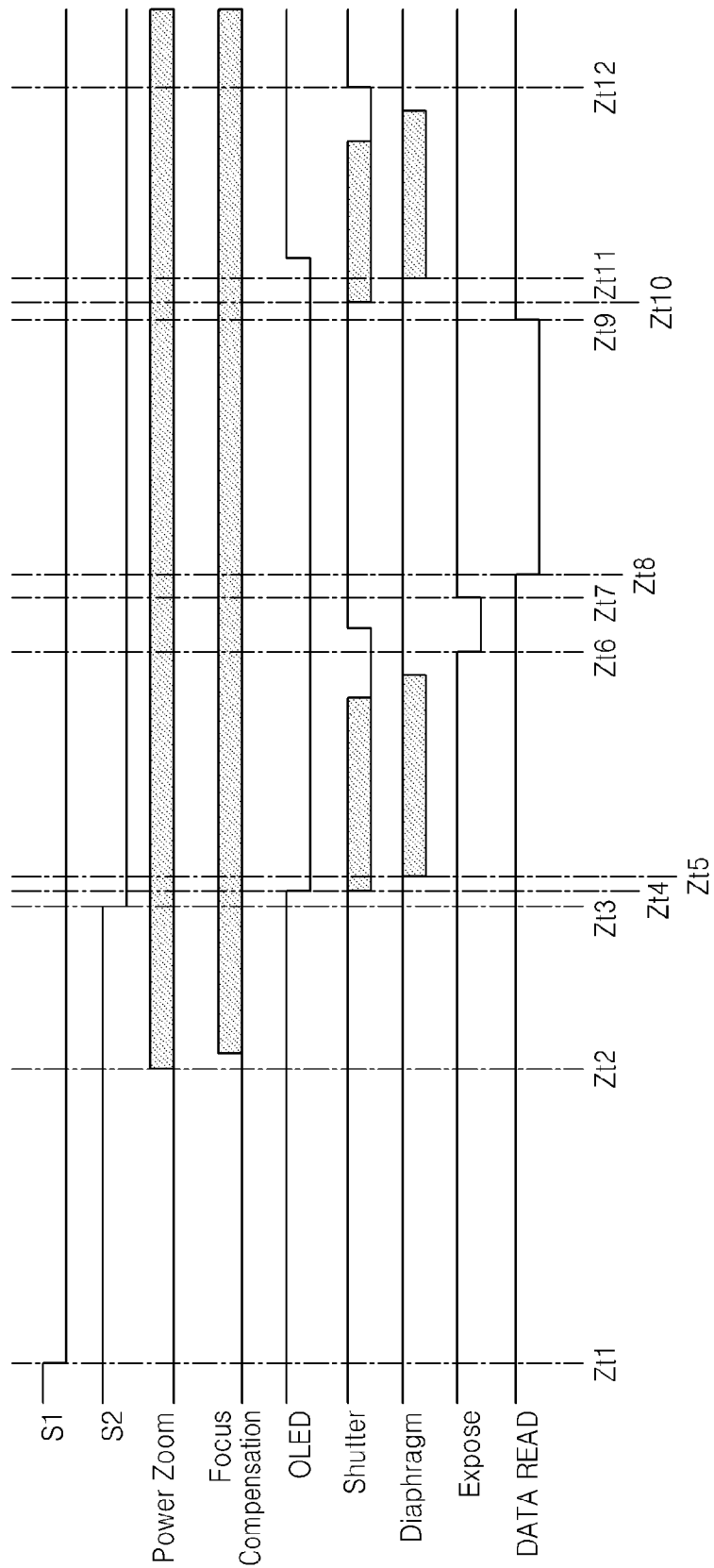
FIG. 6 is a timing diagram showing a method of performing a general power zoom operation.

FIG. 6 is a timing diagram showing a method of performing a general power zoom operation.

Referring to FIG. 6, Power Zoom denotes driving of the zoom lens driving actuator 103 according to zoom manipulation by a user. Focus Compensation denotes a varifocal compensation operation for compensating for a focus location by changing a location of the focus lens 105 when the focus location is changed according to a zoom operation.

In FIG. 6, a power zoom operation is performed when there is spare power because power consumption of the power zoom operation is low, even while a release operation is being performed. When S1 is applied according to manipulation by the user, the digital photographing apparatus 1 starts to operate at a time zt1. Then, an AF operation is performed. Details about the AF operation will be omitted herein, and it is assumed that the AF operation as described above with reference to FIGS. 3A through 3D and 4 is completed before a time zt2.

Meanwhile, the power zoom operation is performed at the time zt2 according to the zoom manipulation by the user. Also, the varifocal compensation operation for compensating for the location of the focus lens according to a zoom operation starts after a predetermined time has passed after the power zoom operation starts. The predetermined time may be 15 ms.

When S2 is in a low level at a time zt3 according to a release operation request of the user, a shutter closing operation for closing the shutter 203 starts at a time zt4, and the iris 108 starts to be driven at a time zt5 after a predetermined time has passed after the time zt4, for example, after 15 ms after the time zt4.

When the driving of the shutter 203 and iris 108 is completed, light exposure starts at a time zt6. When counting of a shutter speed is completed, the shutter 203 is closed to end the light exposure at a time zt7, and data starts to be read at a time zt8.

When the reading of the data is completed at a time zt9, a shutter opening operation for opening the shutter 203 starts at a time zt10, and the iris 108 is opened at a time zt11 after a predetermined time, for example, 15 ms. When the driving of the shutter 203 and iris 108 is completed at a time zt12, a following photographing operation is performed.

As such, the general power zoom operation is performed.

Figure 7:
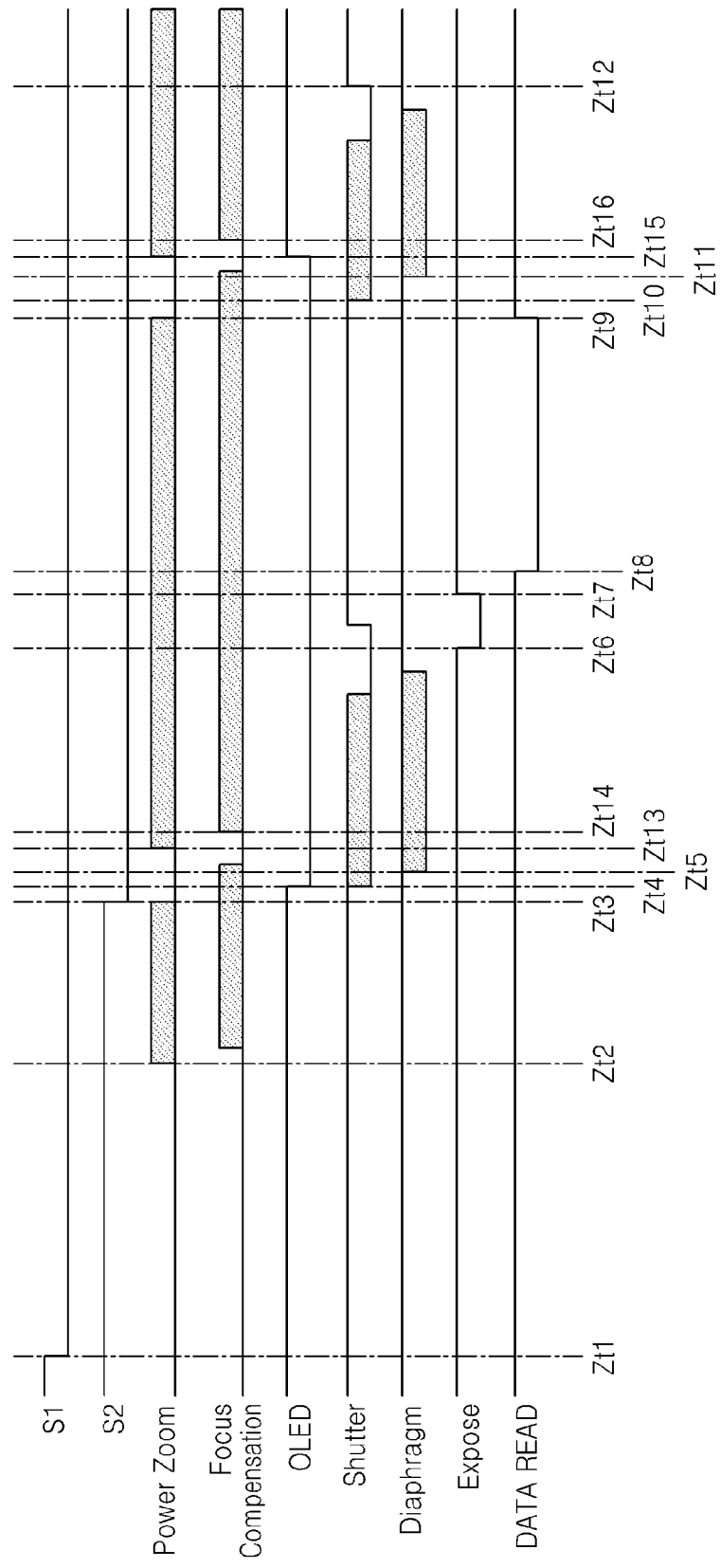
FIG. 7 is a timing diagram sowing a method of performing a power zoom operation, according to an embodiment.

FIG. 7 is a timing diagram showing a method of performing a power zoom operation, according to an embodiment.

Referring to FIG. 7, a power zoom operation is not performed when the shutter 203 starts to be driven because power consumption of the power zoom operation is large. FIG. 7 will now be described based on differences between FIG. 6. When S2 is applied according to manipulation by a user at a time zt3, the power zoom operation is stopped. The power zoom operation is stopped at the same time when S2 is applied, but the focus lens 105 is continuously driven until a varifocal compensation operation is completed so as to accurately perform the varifocal compensation operation at a location where the zoom lens 102 is stopped.

After stopping the power zoom operation, a release operation starts. A shutter closing operation for closing the shutter 203 starts at a time zt4, and the iris 108 starts to be driven at a time zt5 after a predetermined time, for example 15 ms, has passed after the time zt4.

The power zoom operation starts again to be driven at a time zt13 after a predetermined time, for example, after 15 ms, has passed after the iris 108 starts to be driven. The focus lens 105 starts to be driven at a time zt14 to perform the varifocal compensation operation after a predetermined time, for example, after 15 ms, has passed after starting the power zoom operation.

Operations from a time zt6 to a time zt9 in FIG. 7 are identical to those in FIG. 6.

When reading data is completed at the time zt9, the power zoom operation is stopped at the time zt9 so as to drive the shutter 203. After the power zoom operation is stopped, a shutter opening operation and driving of the iris 108 are sequentially performed at times zt10 and zt11.

The power zoom operation starts again to be performed at a time zt15 after a predetermined time, for example, after 15 ms, has passed after the iris 108 starts to be driven, and then the focus lens 105 starts to be driven at a time zt16 to perform the varifocal compensation operation.

As shown in FIG. 7, in the current embodiment, if the release operation is requested to start while performing the power zoom operation, stopping of the power zoom operation is determined according to power consumption of the power zoom operation.

However, in order to simultaneously perform the power zoom operation and the release operation or to stop one of the power zoom operation and the release operation as described above, power supplied from the body unit 200 to the lens 100 or power required to drive the actuators included in the lens 100 needs to be considered.

A method of controlling the digital photographing apparatus 1 according to power consumption of the lens 100 and power supply of the body unit 200 will now be described.

FIGS. 8, 9A, 9B, 10, and 11 are flowcharts illustrating a method of controlling the body unit 200 of the digital photographing apparatus 1, according to an embodiment. FIG. 12 is a set of tables showing lens data, according to an embodiment. In the current embodiment, the lens data including the power consumption information is transmitted from the lens 100 to the body unit 200, and the body unit 200 determines the driving of the actuators included in the lens 100.

Figure 8:
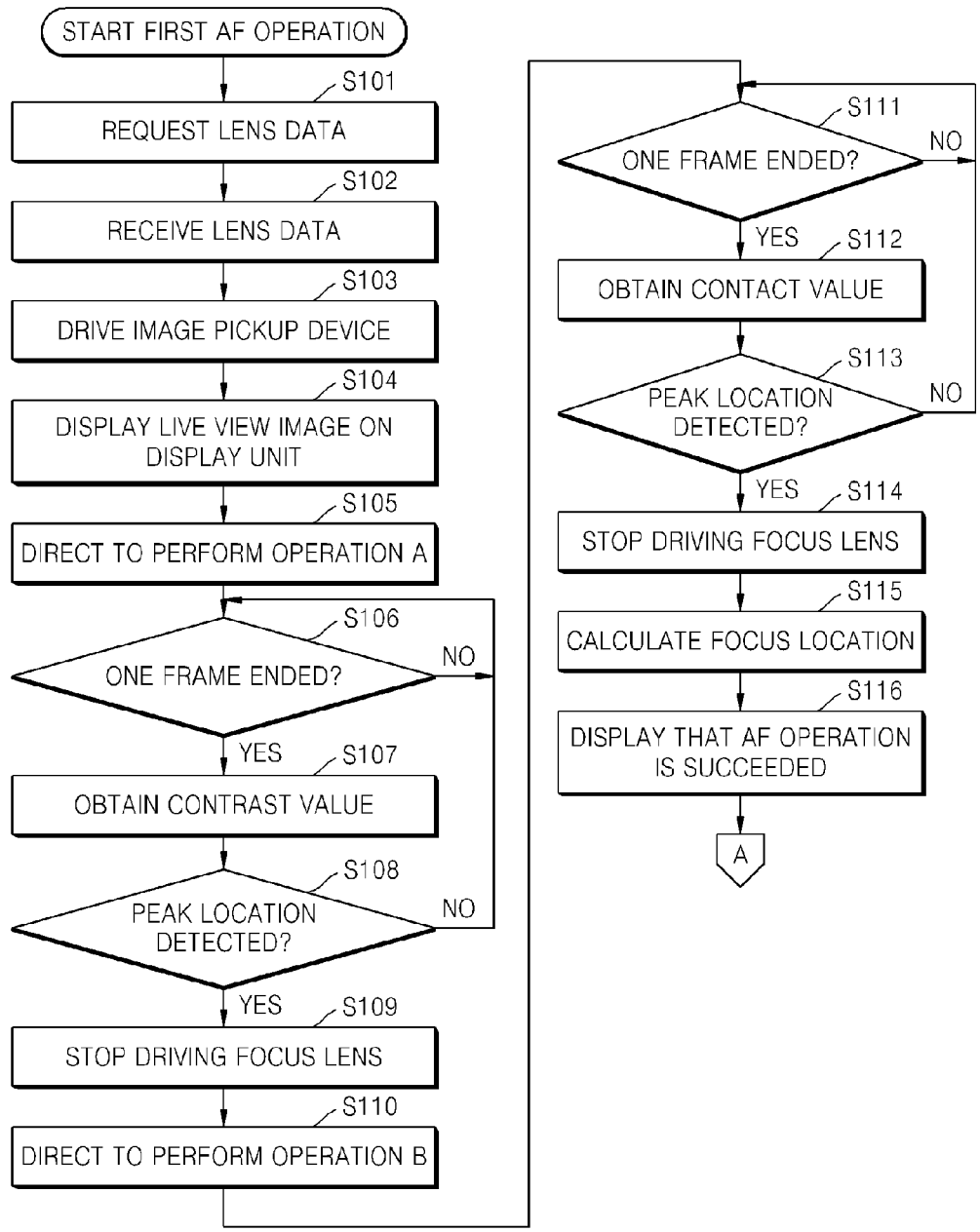
FIGS. 8, 9A, 9B, 10, and 11 are flowcharts illustrating a method of controlling a body unit of a digital photographing apparatus, according to an embodiment.

Referring to FIG. 8, the body unit 200 first requests the lens 100 to transmit lens data in operation S101, and receives the lens data by communicating with the lens 100 in operation S102. The lens data will now be described in detail with reference to FIG. 12.

Referring to FIG. 12, the lens data may include AF driving speed information, sensitivity information of a focus driving amount with respect to a lens driving amount, backlash information, actuator information, power consumption information, iris information, and focal length information.

"Focus Speed" denotes data indicating a driving speed of an AF of the lens 100. For example, the driving speed may be in 10 stages from a lowest speed FS1 to a highest speed FS10. The driving speed may be indicated in a number of steps drivable in 1 second. Here, one step denotes a minimum unit of location control while performing the AF of the lens 100. In FIG. 12, the lens 100 is drivable at 2000 pulses per second (pps) at the lowest speed FS1 and at 6500 pps at the highest speed FS10. When directing the lens 100 to drive the focus lens 105, the body unit 200 may select an optimum driving speed based on "Focus Speed", and the lens 100 may drive the focus lens 105 at the selected driving speed.

"Focus Sensitivity" is a coefficient for converting a defocus constituting a lens defocus amount to a number of driving steps, and denotes sensitivity of a focus driving amount with respect to a lens driving amount. "Focus Sensitivity" includes data corresponding to focal lengths of the zoom lens 102. For example, at a focal length Z1, "Focus Sensitivity" is 0.16 pulse/micron, which means that the zoom lens is 102 driven by 0.16 pulse so as to drive defocus of 1 micron.

"Backlash" denotes a backlash amount generated when a driven direction of the focus lens 105 is reversed, and is shown in units of pulses. According to the current embodiment, for example, 30 pulses of backlash are generated.

"Actuator" denotes data indicating a type of driving actuator for AF. "Actuator" stores data about selecting one of a DC motor, a step motor, an ultrasonic wave motor, and a voice coil motor. A step motor is used in the current embodiment.

"Lens Power" denotes data indicating whether power consumption of an actuator of the lens 100 is equal to or above a base value. For example, the base value may be 2 A. When "Lens Power" is 0, the power consumption may be below or equal to the base value, and when "Lens Power" is 1, the power consumption may be above the base value.

"Open Iris" denotes data of an open F number (FNo) according to the focal lengths. Since the open F number changes according to a zooming operation of the zoom lens 102, "Open Iris" may include the open F number for each of the focal lengths.

"Focus Length" indicates focal length information at each focal length. According to the current embodiment, for example, the lens 100 may be 28 mm at a wide-end and 105.1 mm at a telephoto-end, wherein a focal length range is divided into 8.

The lens data described above is only an example, and may differ according to a type of the lens 100.

Referring back to FIG. 8, after the body unit 200 obtains the lens data, the body unit 200 drives the image pickup device 204 in operation S103, and displays a live view image on the display unit 206 in operation S104.

Then, the lens 100 is directed to be driven so as to perform the AF operation of FIGS. 3A through 3D in operation S105. In operation S105, the operation A performed at a high speed is performed. For example, in the operation A, a driving amount of the lens 100 is set to be F number×300µ during an AF obtaining period. Accordingly, when the lens 100 is located at a wide-end and the F number is 2.8, the lens 100 is moved by 2.8×300µ=840µ in 16.7 ms (60 f/s), which is one detecting period. This means that the lens 100 is driven by about 50400 microns in 1 second. When the driving amount is converted into a driving speed, for example, when the driving amount is multiplied by 0.16 of "Focus Sensitivity" of FIG. 12, the lens 100 is driven at a speed of 8064 pps. However, since the lens 100 cannot be driven at 8064 pps in FIG. 12, the lens 100 is driven at a maximum speed of 6500 pps.

When the operation A starts to be performed, a contrast value of a subject for the AF is obtained at every one frame, that is, a period in which image information is updated, in operations S106 and S107. Then, it is determined whether a peak location of the contrast value is detected in operation S108. For example, contrast values detected in frames may be compared, and it may be determined that the peak location is detected if the contrast values decreases for 2 consecutive frames compared to the contrast value detected in a certain previous frame. In other words, if C(n−1), C(n), C(n+1), and C(n+2) respectively denote contrast values obtained in frames n−1, n, n+1, and n+2, C(n) may be determined to be a peak when C(n)>C(n−1), C(n)>C(n+1), and C(n+1)>C(n+2). When it is determined that the peak location is detected, the focus lens 105 stops being driven in operation S109.

Then, the operation B is performed in operation S110 to precisely detect a focus location. In the operation B, the driving amount of the lens 100 is set to be F number×150µ during the AF obtaining period. Accordingly, when the lens 100 is located at a wide-end and the F number is 2.8, the lens 100 is moved by 2.8×150µ=420µ in 16.7 ms (60 f/s), which is one detecting period. This means that the lens 100 is driven by about 25200 microns in 1 second. When the driving amount is converted into a driving speed, for example, when the driving amount is multiplied by 0.16 of "Focus Sensitivity" of FIG. 12, the lens 100 is driven at a speed of 4032 pps. However, since there is no speed corresponding to 4032 pps in FIG. 12, the lens 100 is driven at a maximum speed of 4000 pps closest to 4032 pps.

When the operation B starts to be performed, the contrast value of the subject for the AF is obtained at every one frame, that is, the period in which image information is updated, in operations S111 and S112. Then, it is determined whether the peak location of the contrast value is detected in operation S113. When it is determined that the peak location is detected, the focus lens 105 stops being driven in operation S114.

Also, in order to more precisely detect the focus location, the focus location is accurately calculated in operation S115 by performing interpolation calculation using the contrast values of C(n−1), C(n), and C(n+1) and the location of the focus lens 105 from the frames where the contrast values are detected. Then, a message that the AF operation has succeeded is displayed in operation S116.

The method will now be described with reference to FIGS. 9A and 9B.

Figure 9A:
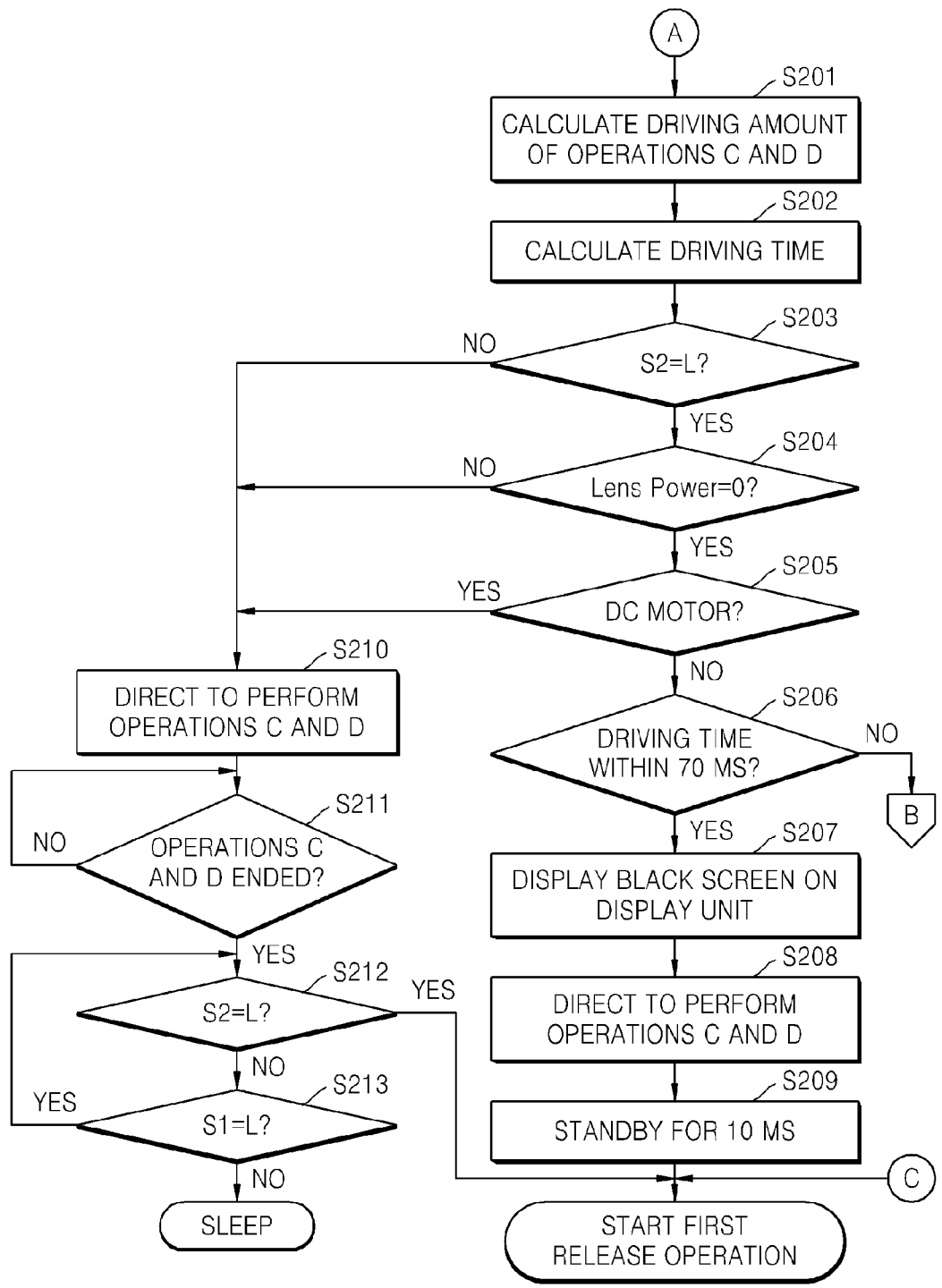
Figure 9B:
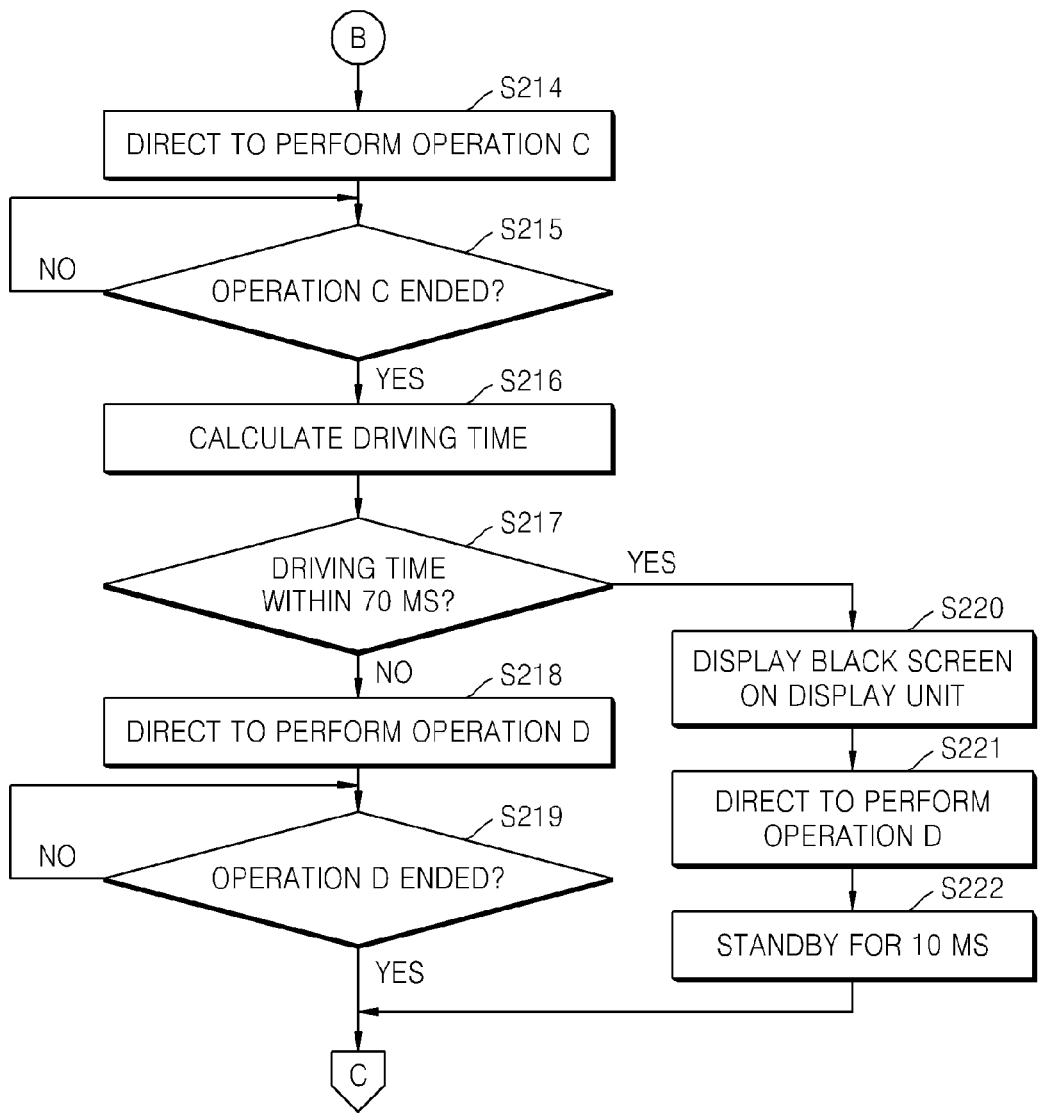

Referring to FIGS. 9A and 9B, a driving amount of the operations C and D for driving the focus lens 105 to the calculated focus location during the AF operation are calculated in operation S201. The driving amount is calculated based on a current location of the focus lens 105, the focus location, and a backlash amount. The driving amount may be obtained by adding a driving amount of the operation C, a driving amount of the operation D, and a driving amount according to a double backlash amount due to two driven direction reversals during the operations C and D.

For example, when the driving amount of the operation C is 280 steps and the driving amount of the operation D is 80 steps, the driving amount of the operations C and D is 360 steps. When the driving amount according to the backlash, here, 30 steps, is added twice, a driving amount of 420 steps is obtained, and the 420 steps is the total driving amount of the operations C and D.

Also, a driving time is calculated by applying a maximum speed of "Focus Speed" to the total driving amount in operation S202. Since the maximum speed is 6500 pps, the driving time according to the current embodiment is 65 ms. The driving time is only an example, and may vary according to "Focus Speed", "Focus Sensitivity", and "Backlash" of a lens.

Referring back to FIG. 9A, it is determined whether S2 requesting to perform a release operation is in a low level (L) in operation S203.

When S2 is in a high level (H), that is, there is no request to perform the release operation, the operations C and D are performed in operation S210. Then, it is determined whether the operations C and D are ended in operation S211, and if the operations C and D are ended, it is again determined whether S2 is in the low level or the high level in operation S212. If S2 is determined to be in the low level, the release operation starts to be performed, and if S2 is determined to be in the high level, operation S213 for determining whether S1 is in a low level is performed.

When S1 is in the low level, operation S212 is performed, and when S1 is in a high level, the body unit 200 enters into a sleep mode.

Meanwhile, if S2 is determined to be in the low level in operation S203, i.e., when the release operation is requested, it is determined if "Lens Power" data is 0 in operation S204. When the "Lens Power" data is 1 and thus the power consumption of the lens 100 exceeds 2 A, it is difficult to simultaneously drive the shutter 203, the iris 108, and the focus lens 105. Accordingly, operation S210 is performed to end the driving of the focus lens 105 before the release operation. Alternatively, when the "Lens Power" data is 0, it is determined whether the lens driving actuator 106 is a DC motor in operation S205. If it is determined that the lens driving actuator 106 is a DC motor, operation S210 is performed to end the driving of the focus lens 105 before the release operation since the DC motor has a high driving current. If the lens driving actuator 106 is not a DC motor, it is determined whether the driving time calculated in operation S202 is within a predetermined value in operation S206. Here, the predetermined value may be a value enabling the time t7 of FIG. 5 when the operations C and D are ended to be the time t10 when the light exposure starts. Alternatively, the predetermined value may be a time required to process the release operation, wherein the driving of the shutter 203 and the iris 108 are performed during this time. For example, the predetermined value may be 70 ms.

When a driving time of the operations C and D is determined to be within 70 ms in operation S206, displaying of the live view image is stopped to reduce power consumption, and a black screen is displayed on the display unit 206 in operation S207. Then, the operations C and D are directed to be performed on the lens 100 in operation S208. Then, the body unit 200 stands by for about 10 ms, after directing the operations C and D to be performed, in operation S209.

When it is determined that the driving time is equal to or above 70 ms in operation S206, the AF operation does not end during the release operation. Accordingly, the operation C is performed and then ended in operations S214 and S215. Then, a driving time of the operation D is calculated again in operation S216. Here, the driving time is calculated by adding the backlash amount to the driving amount of the operation D. For example, when the driving amount of the operation D is 80 steps and the driving amount of the backlash is 30 steps, the total driving amount of the operation D is 110 steps. When the operation D is performed at the driving speed of 6500 pps, the driving time is 17 ms.

After calculating the driving time of the operation D, it is determined whether the driving time is within a predetermined value in operation S217. When the driving time of the operation D is within the predetermined value, for example, within 70 ms, the displaying of the live view image is stopped, and a black screen is displayed on the display unit 206 in operation S220. Then, the lens 100 is directed to perform the operation D in operation S221, and the release operation is performed after standing by for about 10 ms in operation S222.

Alternatively, when the driving time is determined to be equal to or above the predetermined value in operation S217, the operation D is performed in operation S218, and the end of the operation D is determined in operation S219.

Next, the method will be described with reference to FIG. 10.

Figure 10:
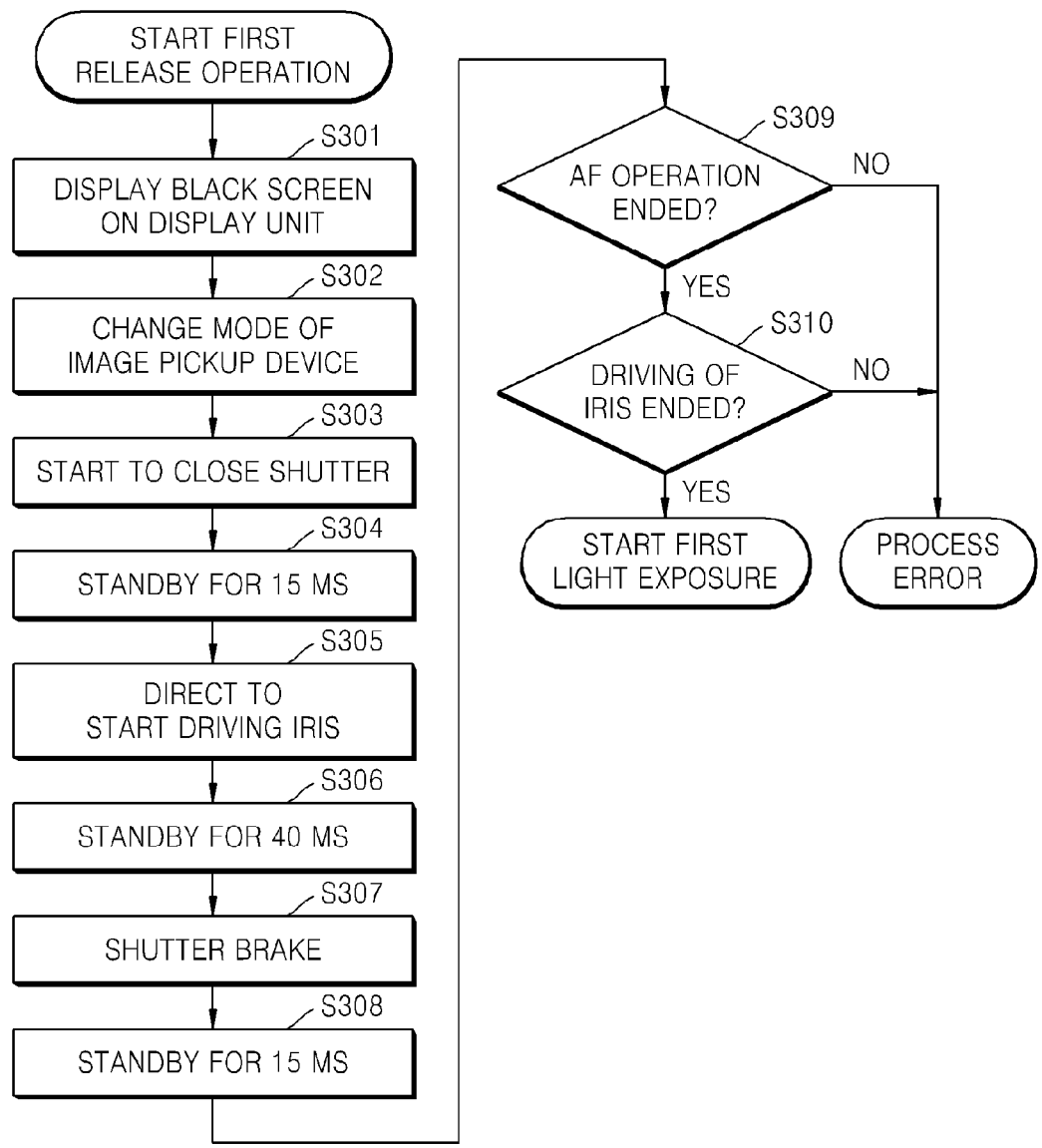

Referring to FIG. 10, when the release operation starts, a black screen is displayed on the display unit 206, and it is displayed to the user that the release operation is being performed, in operation S301. When an OLED is used as the display unit 206, power consumption is almost proportional to display luminance since the OLED is a self-emission display device. Accordingly, by displaying a black screen, required power is reduced, thereby increasing power supplied to an actuator or the like during the release operation.

The image pickup device 204 is entered into a still image capture mode in operation S302, and the shutter 203 is changed from an open state so as to display a live view image to a closed state in operation S303. Since a DC motor is used as an actuator for driving the shutter 203, a high driving current is required to start driving the shutter 203. Accordingly, the body unit 200 stands by for a predetermined time, for example, about 15 ms, in operation S304 after the shutter 203 starts to be driven, and directs the lens 100 to drive the iris 108 in operation S305.

The body unit 200 stands by for about 40 ms, to end the driving of the shutter 203 in operation S306, and then a shutter brake is put on the shutter 203 in operation S307. Then, the body unit 200 stands by for about 15 ms, to end the driving of the iris 108 in operation S308, and then it is determined whether the AF operation and the driving of the iris 108 are ended respectively in operation S309 and S310.

When the AF operation or the driving of the iris 108 is not ended, it is determined that a mechanical error has been generated, and thus an error process is performed. When the AF operation and the driving of the iris 108 are normally ended, light exposure starts to be performed.

Next, the method will now be described with respect to FIG. 11.

Figure 11:
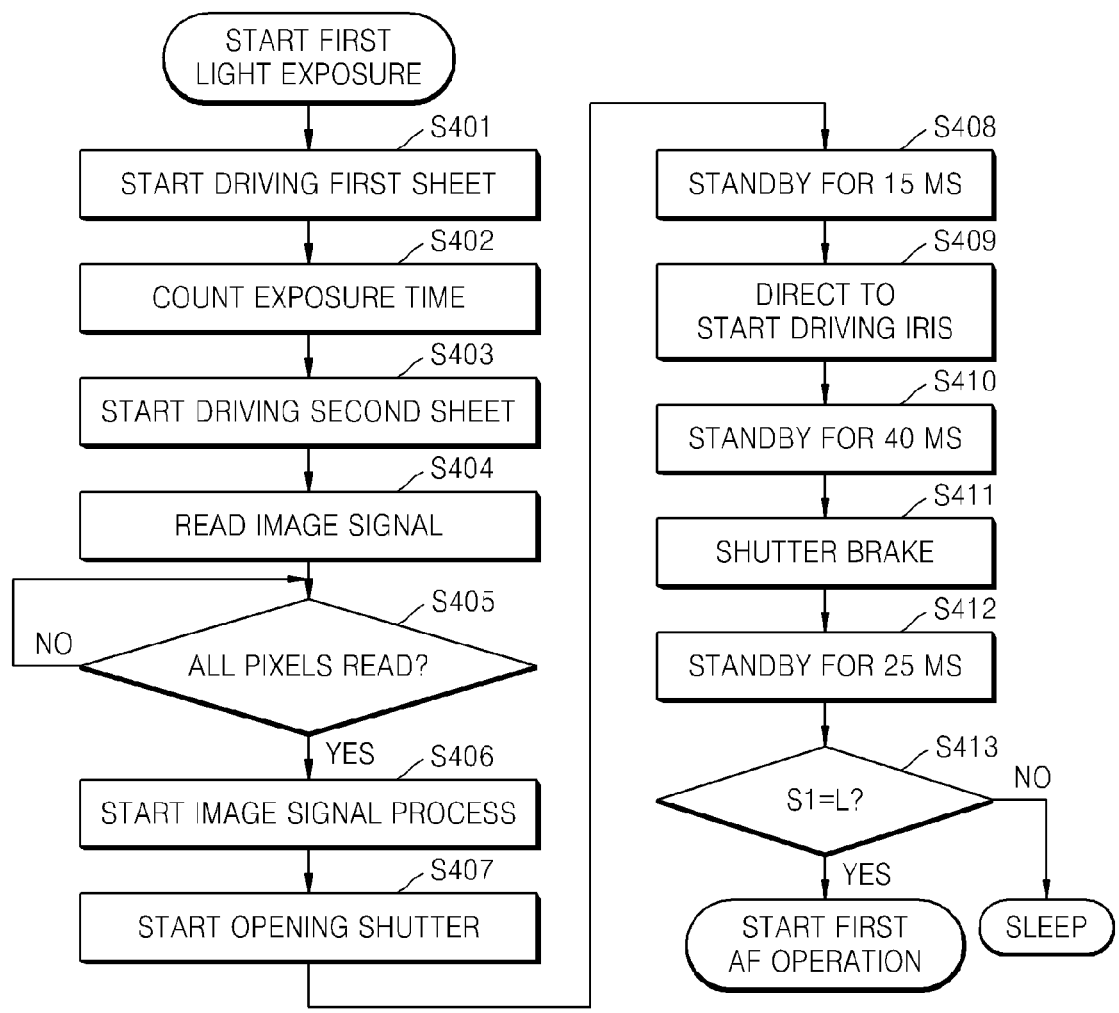

Referring to FIG. 11, when the light exposure starts to be performed, a first sheet or a front sheet of the shutter 203 is driven in operation S401. Accordingly, an exposure time is counted in operation S402. When a predetermined exposure time has passed, a second sheet or a rear sheet is driven in operation S403.

After the first and second sheets are driven, an image signal is read in operation S404 by a CMOS image sensor constituting the image pickup device 204. When it is determined that operation S404 has been performed on all pixels in operation S405, an image signal process for accumulating an image as an image file is performed in operation S406.

Then, since all pixels are read, the shutter 203 is opened in operation S407 for following photographing, and then the body unit 200 stands by for about 15 ms, in operation S408.

The lens 100 is directed to start opening the iris 108 after the standby in operation S409, and the body unit 200 stands by for about 40 ms, in operation S410.

After 40 ms, the driving of the shutter 203 is stopped and thus a shutter brake is put on the shutter 203 in operation S411, and the body unit 200 stands by for about 25 ms, in operation S412. Then, it is determined whether S1 is in the low level in operation S413. If S1 is in the low level, the AF operation is again performed, and if S1 is in the high level, the body unit 200 is entered into the sleep mode since the digital photographing apparatus 1 is not being manipulated.

As such, the AF operation and the release operation are performed by the body unit 200.

Standby times, etc. used while describing the current embodiment are only examples, and may vary.

Figure 13:
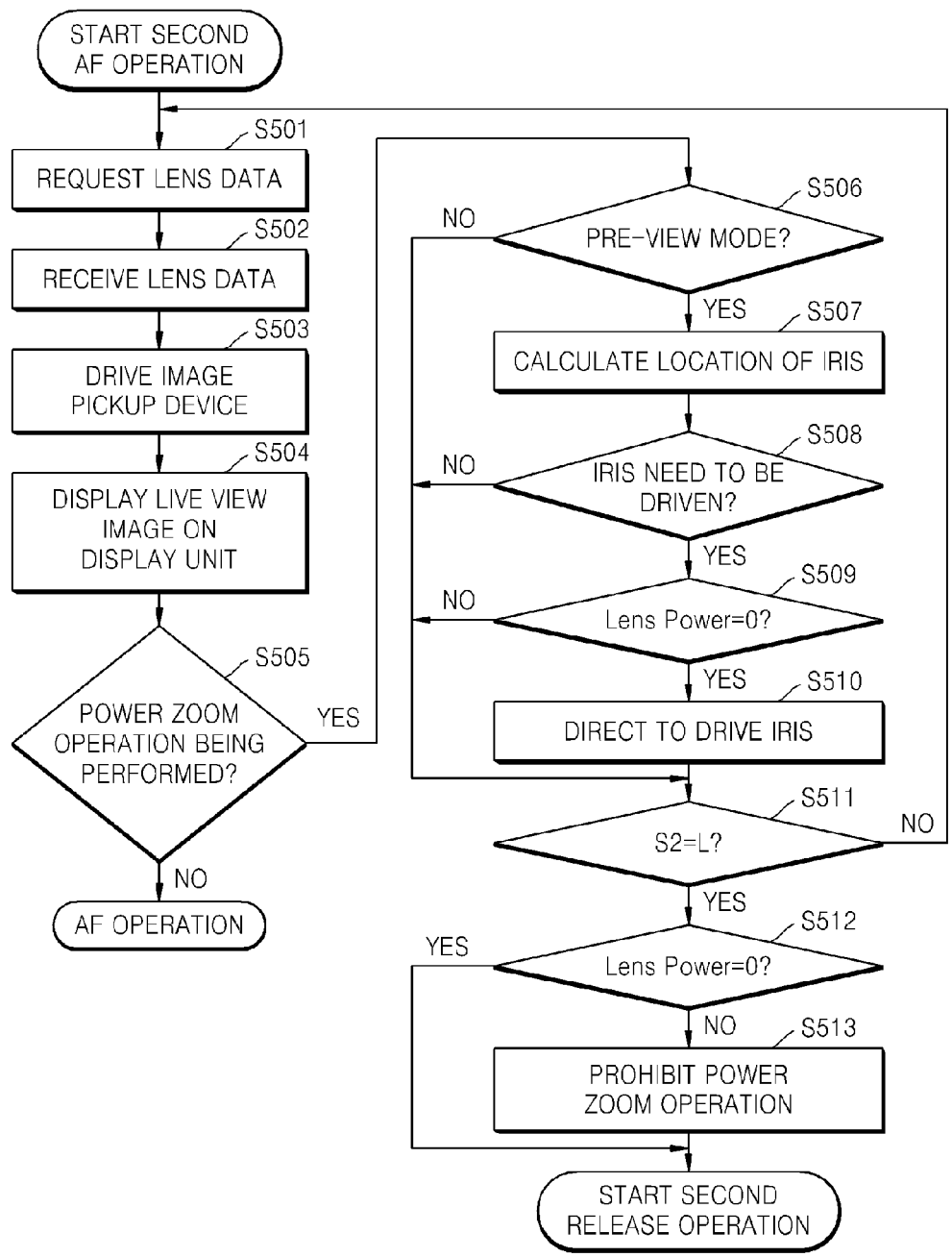
FIGS. 13, 14, and 15 are flowcharts illustrating a method of controlling a body unit of a digital photographing apparatus, according to another embodiment.
Figure 14:
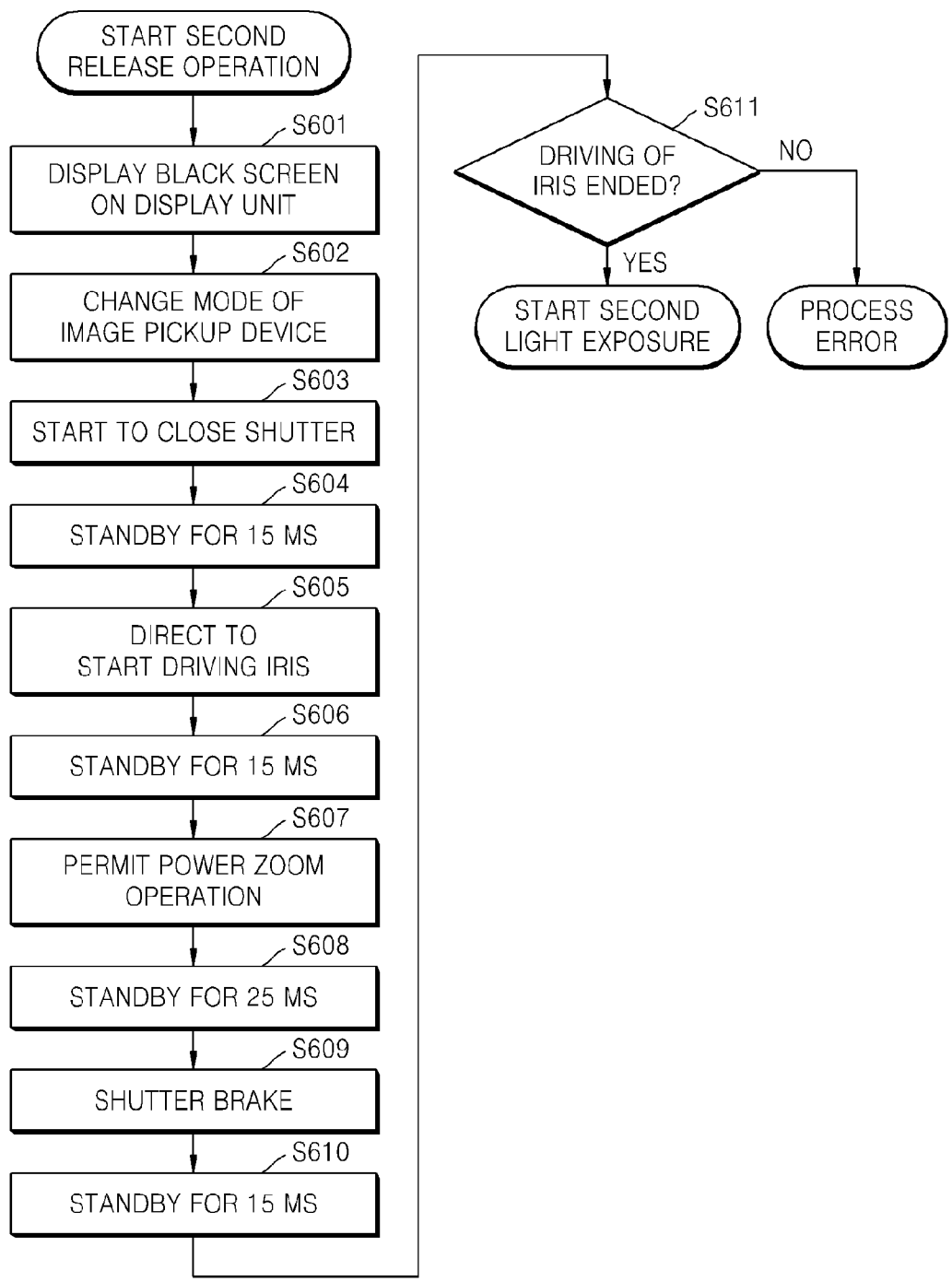
Figure 15:
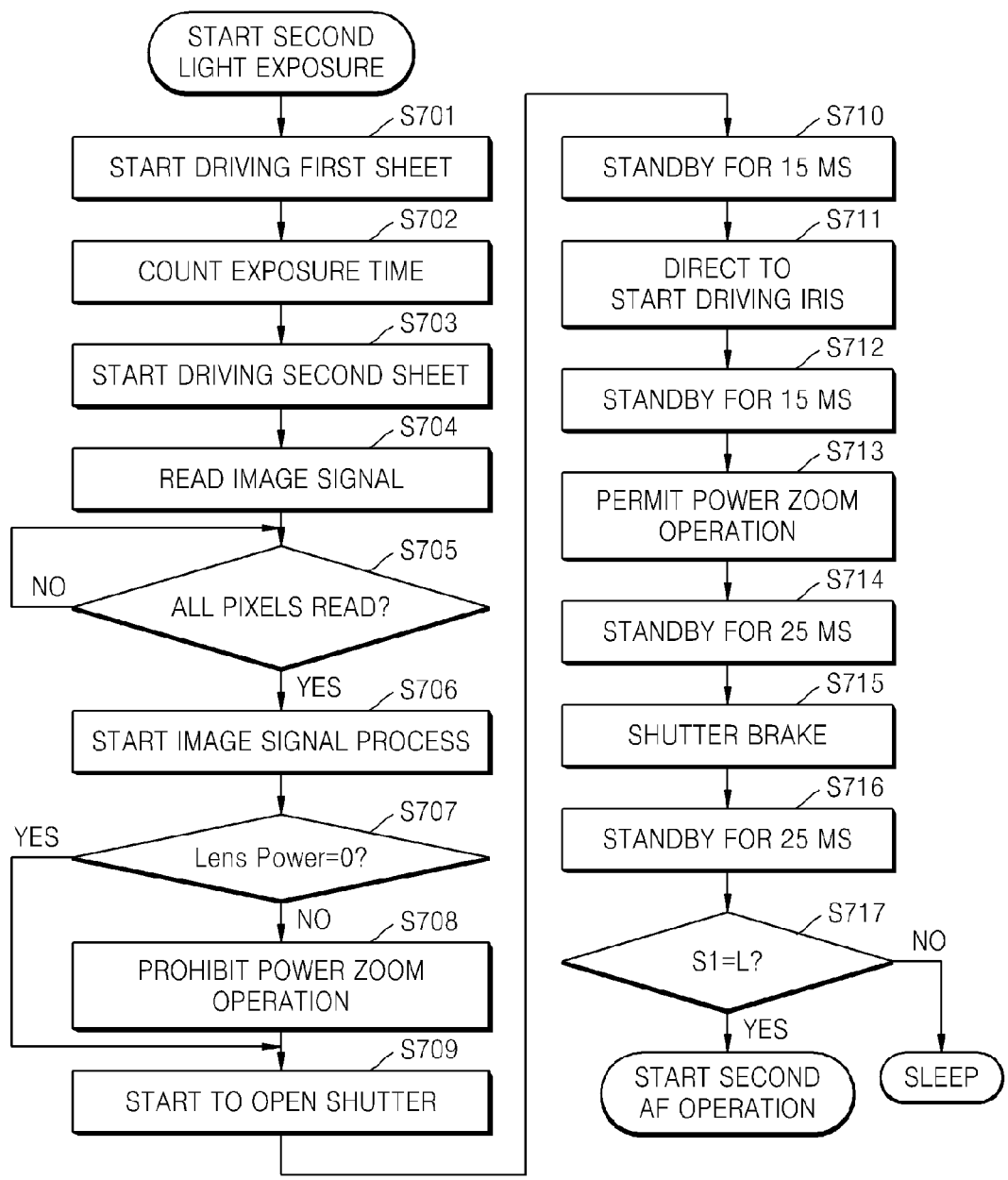

FIGS. 13, 14, and 15 are flowcharts illustrating a method of controlling the body unit 200 of the digital photographing apparatus 1, according to another embodiment. In the current embodiment, the lens data including the power consumption information is transmitted from the lens 100 to the body unit 200, and the body unit 200 determines the driving of the actuators included in the lens 100.

Referring to FIG. 13, the body unit 200 first requests the lens 100 to transmit the lens data in operation S501, and receives the lens data by communicating with the lens 100 in operation S502. The lens data has been described above with reference to FIG. 12, and thus details thereof will not be repeated. Meanwhile, although not illustrated in FIG. 13, the power zoom operation is permitted in the lens 100 before communicating with the lens 100.

After the body unit 200 obtains the lens data, the body unit 200 drives the image pickup device 204 in operation S503, and displays a live view image on the display unit 206 in operation S504.

Then, it is determined whether the power zoom manipulation is being performed in operation S505. The determination is performed by receiving information of power zoom manipulation. If the power zoom operation is not performed, an AF operation is performed as described with reference to FIGS. 8 through 11.

If the power zoom manipulation is being performed, it is determined whether a live view image is displayed by adjusting the iris 108 to a set iris value or by opening the iris 108 in operation S506. In other words, it is determined whether the digital photographing apparatus 1 is in a pre-view mode. Here, the pre-view mode is also applied when the user captures a moving image by using the set iris value.

In the pre-view mode, a location of the iris 108 from a current focal distance is calculated in operation S507. Even when a diameter of the iris 108 is mechanically the same, the zoom lens 102 may have a different effective F number according to a focal distance. Such a change of the F number is calculated from Open Iris received from the lens 100.

It is determined whether a current diameter of the iris 108 needs to be changed in operation S508, and if the iris 108 is needed to be driven, it is determined whether power consumption of the lens 100 is below or equal to 2 A as Lens Power is 0, in operation S109. If the power consumption is below or equal to 2 A, the power zoom operation and driving of the iris 108 may be simultaneously performed, and thus the lens 100 is directed to drive the iris 108 in operation S510.

Alternatively, since a maximum current supplied from the body unit 200 to the lens 100 is 2 A, when the power consumption exceeds 2 A, the iris 108 is not driven. Also, if the digital photographing apparatus 1 is not in the pre-view mode, the iris 108 is not driven.

Next, it is determined whether S2 is in a low level and a release operation is requested to start, in operation S511. If the release operation is not requested to start, operation S501 is performed. Alternatively, if the release operation is requested to start, it is determined whether Lens Power is 0 in operation S512. When Lens Power is 1, the power consumption of the lens 100 exceeds 2 A, and thus the driving of the power zoom operation is prohibited in operation S513, and the release operation starts. When Lens Power is 0, the release operation starts immediately.

Next, the method will be described with reference to FIG. 14.

Referring to FIG. 14, operations S601 through S605 are respectively identical to operations S301 through S305 of FIG. 10.

After operation S305, in order to have enough driving current required for the power zoom operation, the power zoom operation is permitted after standing by for about 15 ms after the iris 108 starts to be driven in operations S606 and S607. When the power zoom operation is prohibited in operation S513, the lens 100 starts to perform the power zoom operation in operation S607.

The shutter brake is put on the shutter 203 in operation S609, after standing by for about 25 ms in operation S608. Then, the body unit 200 stands by for about 15 ms, to end the driving of the iris 108 in operation S610, and then it is determined whether the driving of the iris 108 is ended respectively in operation S611.

When the driving of the iris 108 is not ended, it is determined that a mechanical error has been generated, and thus an error process is performed. When the driving of the iris 108 is normally ended, light exposure starts to be performed.

Next, the method will now be described with respect to FIG. 15.

Referring to FIG. 15, operations S701 through S706 are respectively identical to operations S401 through S406 of FIG. 11.

After operation S706, it is determined whether Lens Power is 0 in operation S707, and if Lens Power is not 0, performing of the power zoom operation is prohibited in operation S708. Then, an operation of opening the shutter 203 starts in operation S709 for a following photograph, and the digital photographing apparatus 1 stands by for about 15 ms in operation S710. After the stand by, the lens 100 is directed to start an operation of opening the iris 108 in operation S711, the digital photographing apparatus 1 stands by for about 15 ms in operation S712, and then permits the performing of the power zoom operation in operation S713.

After the performing of the power zoom operation is permitted, the digital photographing apparatus 1 stands by for about 25 ms in operation S714, and the shutter brake is put on the shutter 203 in operation S715 as the driving of the shutter 203 is completed. Then, the digital photographing apparatus 1 stands by for about 25 ms in operation S716.

Then, it is determined whether S1 is in a low level in operation S717. When S1 is in the low level, the AF operation starts again, and when S1 is in a high level, the digital photographing apparatus 1 is not being manipulated, and thus is in a sleep state.

As such, the power zoom operation and the driving of the shutter 203 and iris 108 are performed by the body unit 200.

Standby times, etc. used while describing the current embodiment are only examples, and may vary.

FIGS. 16A, 16B, 17, 18, and 19 are flowcharts illustrating a method of controlling the lens 100 of the digital photographing apparatus 1, according to an embodiment.

Figure 16A:
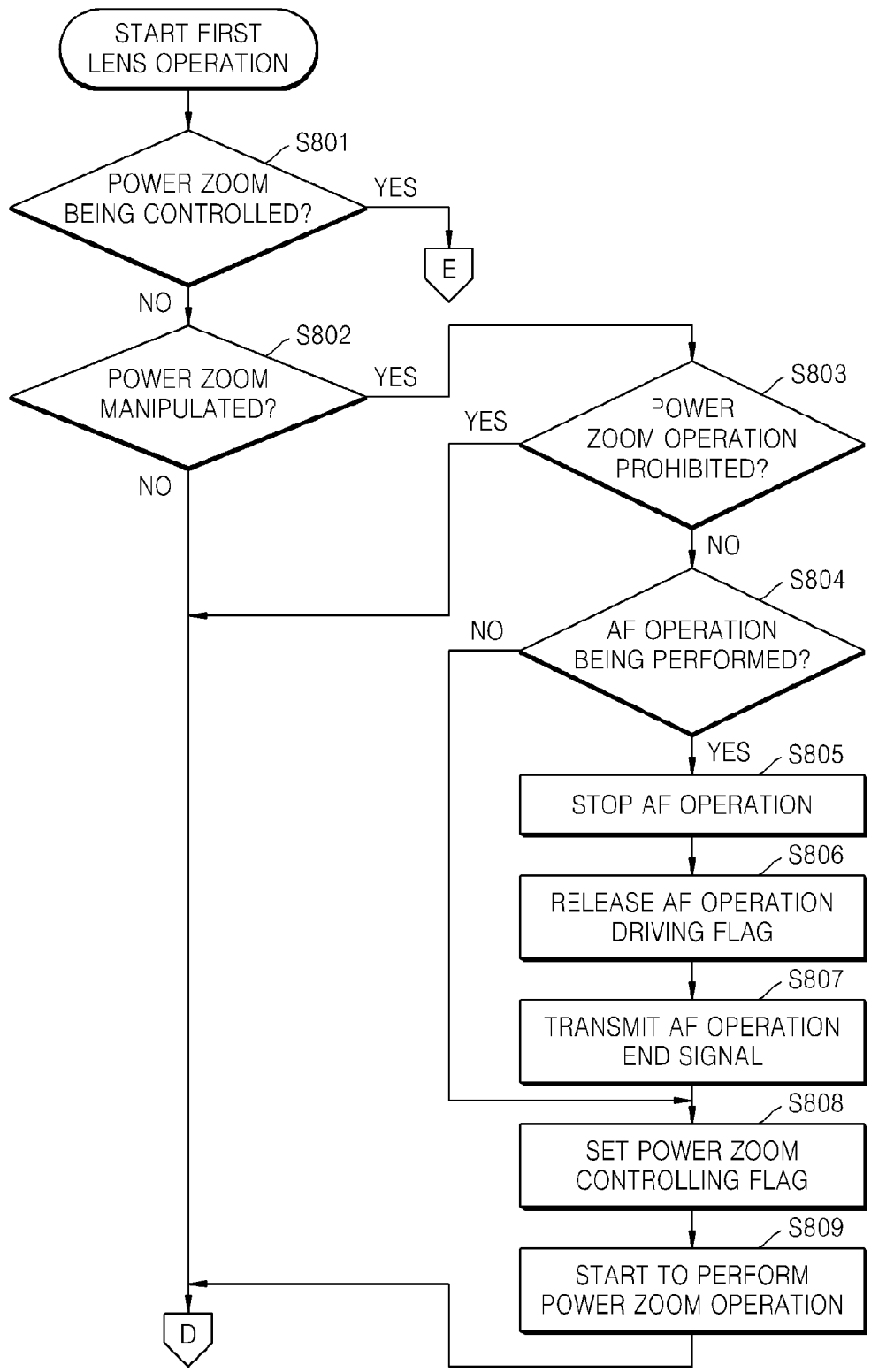
FIGS. 16A, 16B, 17, 18, and 19 are flowcharts illustrating a method of controlling a lens of a digital photographing apparatus, according to an embodiment.
Figure 16B:
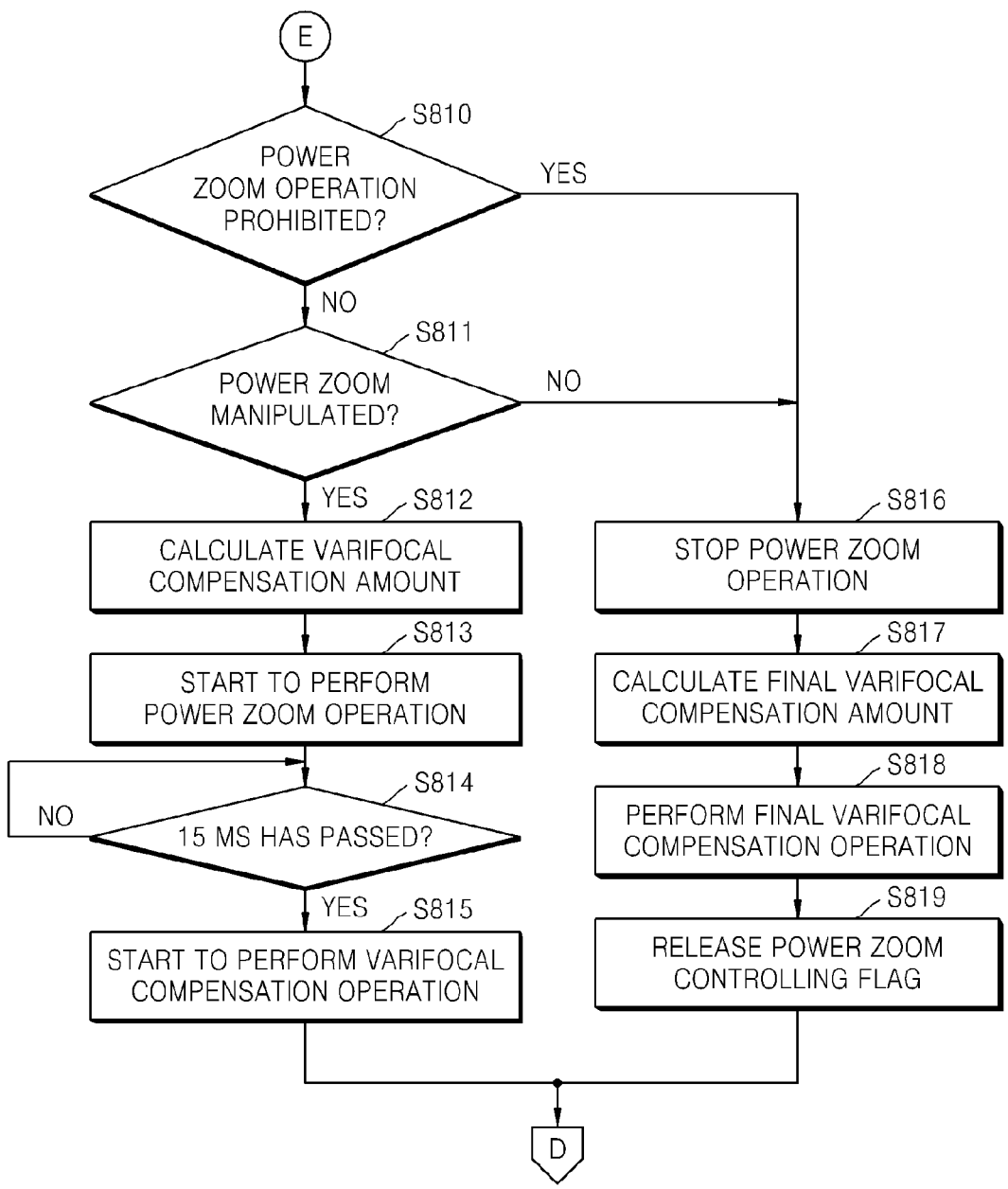

Referring to FIGS. 16A and 16B, when the lens 100 starts to be driven, it is determined first whether power zoom is being controlled in operation S801. If a power zoom operation is not performed, it is determined whether the power zoom is being manipulated in operation S802.

If the power zoom is being manipulated, it is determined whether performing of the power zoom operation is prohibited by the body unit 200 in operation S803. If the performing of the power zoom operation is not prohibited, it is determined whether an AF operation is being currently performed in operation S804.

If the AF operation is not being performed, a power zoom controlling flag is set in operation S808. Then, the power zoom operation starts to be performed in operation S809. Here, the body unit 200 performs the AF operation.

Alternatively, if the power zoom is manipulated while performing the AF operation, the power zoom is first performed. Accordingly, if it is determined that the AF operation is being performed in operation S804, the AF operation is stopped in operation S805, and an AF operation performing flag is released in operation S806. Then, an AF operation end signal is transmitted to the body unit 200 in operation S807. After the AF operation end signal is transmitted, the power zoom controlling flag is set in operation S808. Then, the power zoom operation starts to be performed in operation S809.

Figure 17:
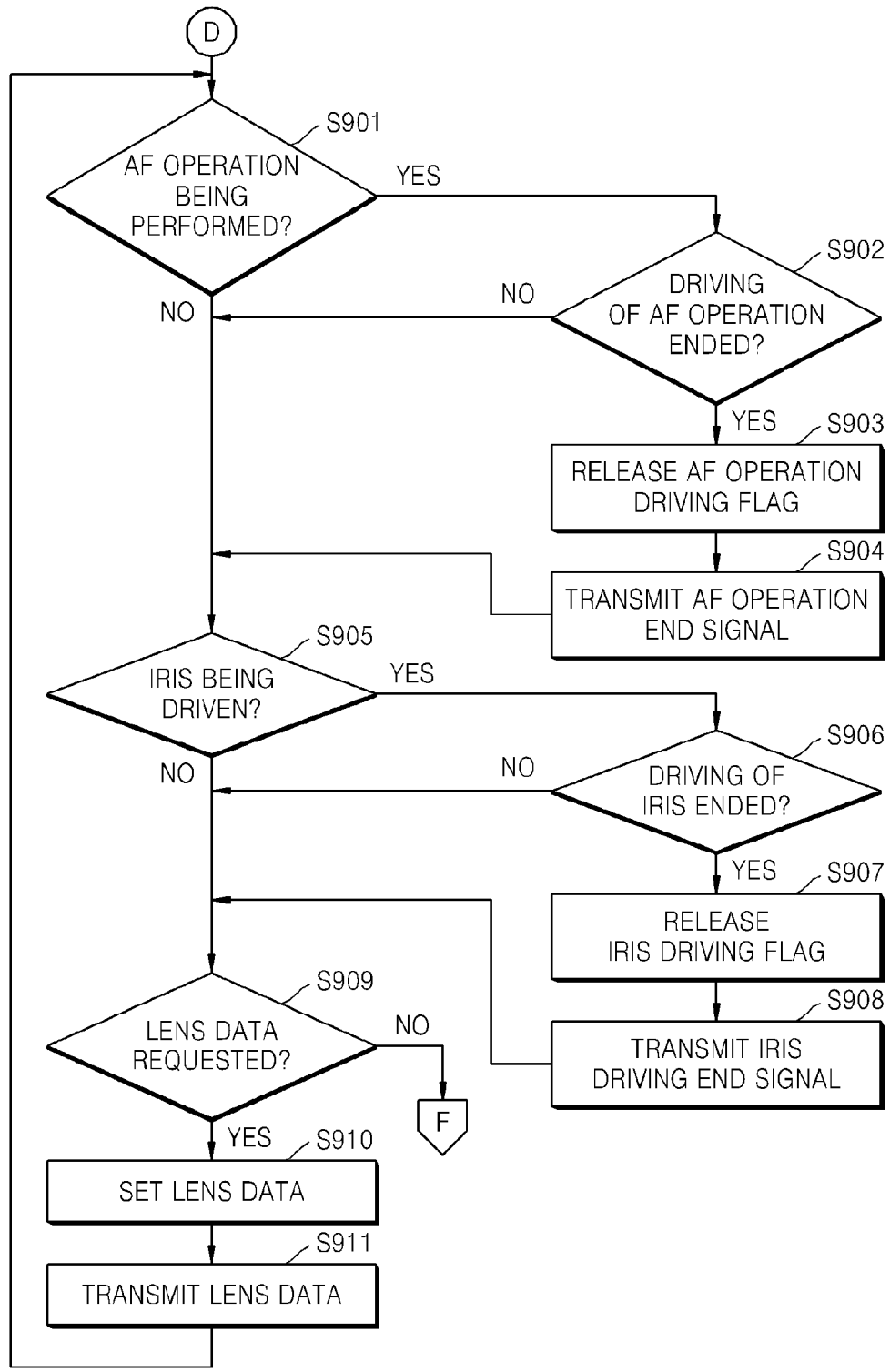

If it is determined that the power zoom is not manipulated in operation S802 or that the performing of the power zoom operation is prohibited in operation S803, operation S901 of FIG. 17 is performed.

Meanwhile, if it is determined that the power zoom is being controlled in operation S801, it is determined whether the performing of the power zoom operation is prohibited in operation S810. If the performing of the power zoom operation is not prohibited, it is determined whether the power zoom is being currently manipulated in operation S811.

If the power zoom is being manipulated, the power zoom operation is continuously performed. Also, a varifocal compensation amount is calculated in operation S812, and the power zoom operation starts to be performed in operation S813. The digital photographing apparatus stands by about 15 ms in operation S814 after the power zoom operation starts to be operated, and after about 15 ms, a varifocal compensation operation starts to be performed in operation S815. The varifocal compensation operation does not start before about 15 ms has passed, thereby differentiating a point of time when the zoom lens 102 starts to be driven and a point of time when the focus lens 105 starts to be driven. Accordingly, a driving current is not repeatedly generated.

Meanwhile, if it is determined that the performing of the power zoom operation is prohibited in operation S810 or that the power zoom is not manipulated in operation S811, the power zoom operation is stopped in operation S816. Also, a final varifocal compensation amount is calculated in operation S817 at a location where the zoom lens 102 is stopped, and the focus lens 105 is driven to perform a final varifocal compensation operation in operation S818. The power zoom controlling flag is released in operation S819.

The method will now be described with respect to FIG. 17.

Referring to FIG. 17, when the lens 100 starts to be driven, it is determined whether the AF operation is being performed in operation S901. When the AF operation is being performed, it is determined whether the AF operation is ended in operation S902. When the AF operation is ended, an AF operation driving flag is released in operation S903, and an AF operation end signal is transmitted to the body unit 200 in operation S904.

When the AF operation is not being performed or the AF operation is ended, it is determined whether the iris 108 is being driven in operation S905. If the iris 108 is being driven, it is determined whether the driving of the iris 108 is ended in operation S906. If the driving of the iris 108 is ended, an iris driving flag is released in operation S907, and an iris driving end signal is transmitted to the body unit 200 in operation S908.

If the iris 108 is not being driven or the driving of the iris 108 is ended, it is determined whether the body unit 200 requested to transmit lens data in operation S909. If the lens data is requested, the lens data is set in operation S910, the set lens data is transmitted to the body unit 200 in operation S911, and then operations S901 through S910 are performed again.

The method will now be described with reference to FIG. 18.

Figure 18:
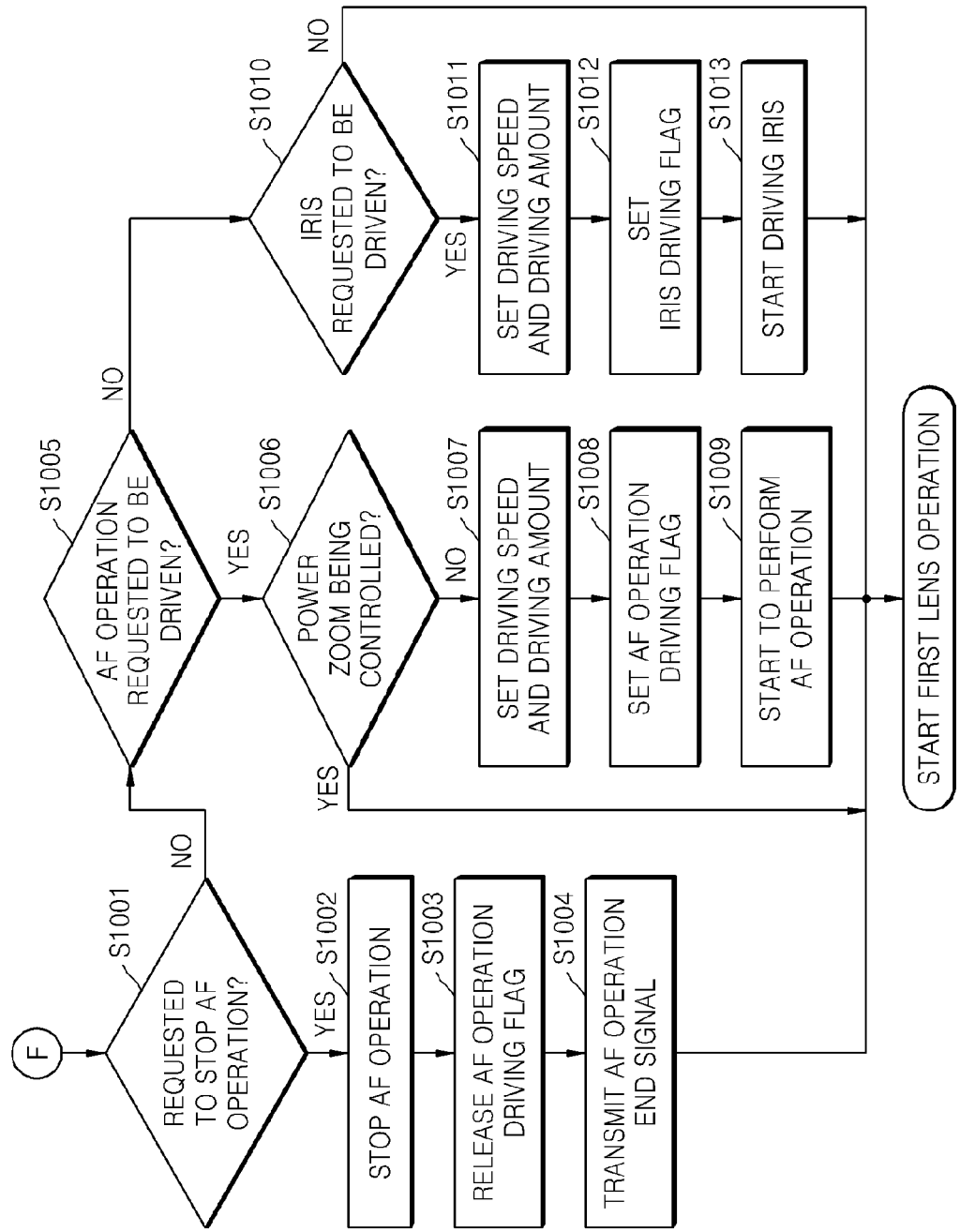

Referring to FIG. 18, if the body unit 200 did not request to transmit the lens data (see operation S909 in FIG. 17), it is determined whether the AF operation is requested to be stopped in operation S1001. If the AF operation is requested to be stopped, the driving of the focus lens 105 is immediately stopped in operation S1002, and a focus lens driving flag is released in operation S1003. Then, an AF operation end signal is transmitted to the body unit 200 in operation S1004.

Meanwhile, if the AF operation is not requested to be stopped, it is determined whether the AF operation is requested to be performed in operation S1005. If the AF operation is requested to be performed, it is determined whether a power zoom is being controlled in operation S1006. If the power zoom is not being controlled, a driving speed and a driving amount of the AF operation are set in operation S1007 according to a direction of the body unit 200, and an AF operation driving flag is set in operation S1008. Then, the AF operation starts to be driven in operation S1009. Although not shown in FIG. 18, the performing of the AF operation may be performed by a step motor, and the driving speed and the driving amount may be set in a driver integrated circuit (IC) so as to automatically perform the AF operation.

Alternatively, if the AF operation is not requested to be performed in operation S1005, it is determined whether the iris 108 is requested to be driven in operation S1010. If the iris 108 is requested to be driven, a driving speed and a driving amount of the iris 108 are set in operation S1011 according to the direction of the body unit 200, and an iris driving flag is set in operation S1012. Then, the iris 108 is driven in operation S1013. If the iris 108 is not requested to be driven in operation S1010, the power zoom is being controlled in operation S1006, or after each of the operations S1004, S1009, and S1013, the lens 100 starts to be driven so as to control a following loop.

The method will now be described with reference to FIG. 19.

Figure 19:
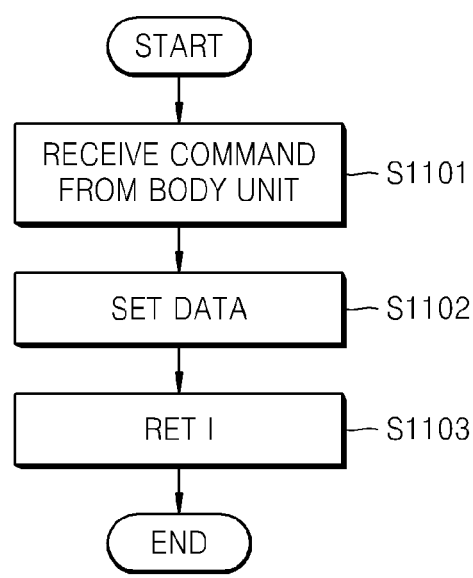

FIG. 19 shows a case when data is received from the body unit 200. An interrupt process is performed on the data from the body unit 200 according to an update request from the body unit 200.

Upon receiving a command from the body unit 200 in operation S1101, the data is set according to the received command via the interrupt process in operation S1102. After the data is set, the lens 100 returns from an interrupt process loop (returns from an interrupt routine (RETI)), in operation S1103.

As such, the lens 100 performs the AF operation, the release operation, and the power zoom operation, and drives the shutter 203 and iris 108, according to the current embodiment.

In the above embodiments described above, the lens data including the power consumption information is transmitted from the lens 100 to the body unit 200, and the body unit 200 generates the command signal for controlling the driving of the actuators included in the lens 100 based on the power consumption information. The generated command signal is transmitted to the lens 100, and the driving of the actuators is controlled by the lens controller 111.

As such, the actuators included in the lens 100 may be stably controlled as the body unit 200 determines a method of driving the actuators based on the power consumption information received from the lens 100, i.e., whether to drive the actuators simultaneously or sequentially, or whether to prohibit the driving of the actuators.

Figure 20:
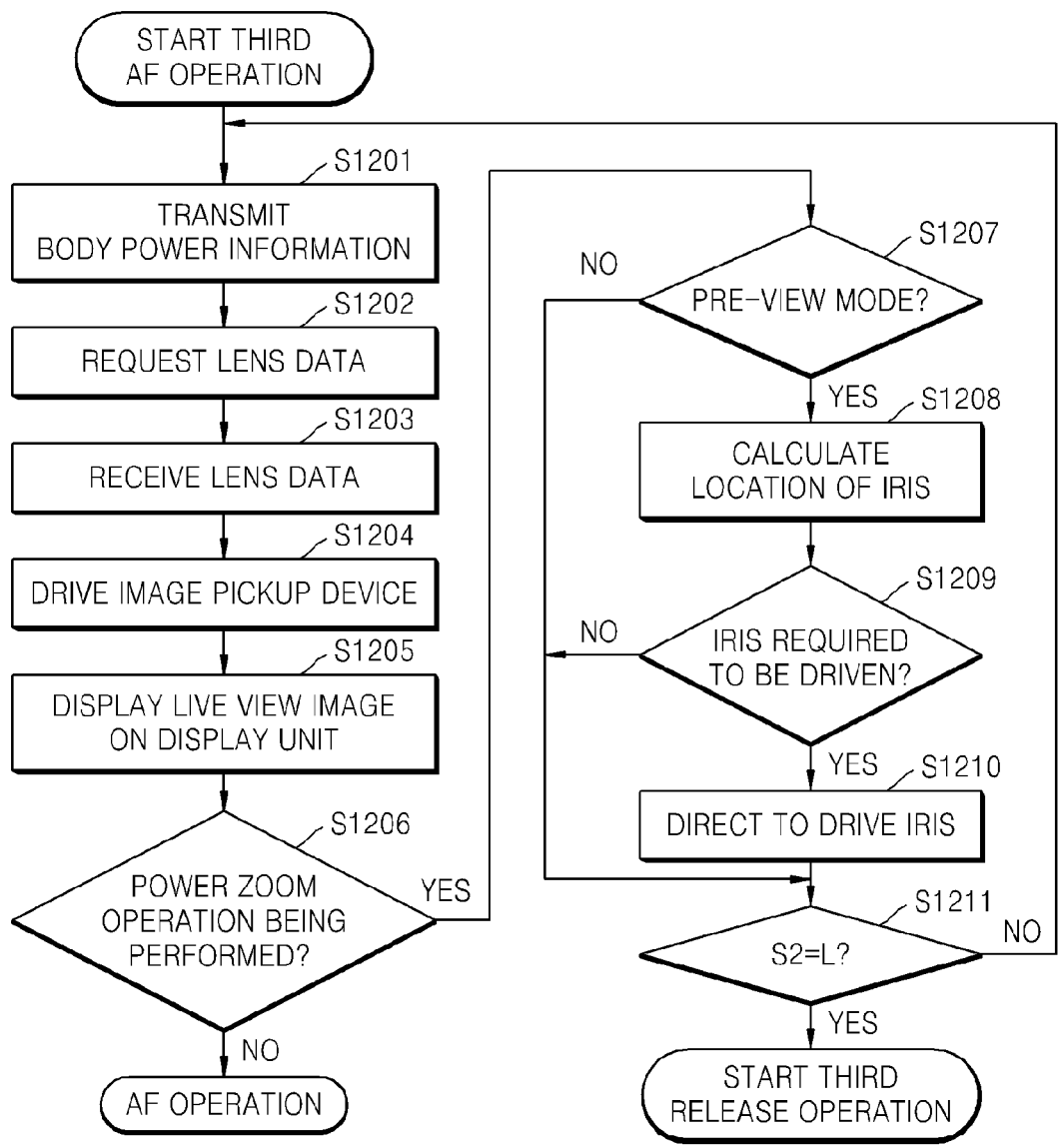
FIGS. 20, 21, and 22 are flowcharts illustrating a method of controlling a body unit of a digital photographing apparatus, according to another embodiment.
Figure 21:
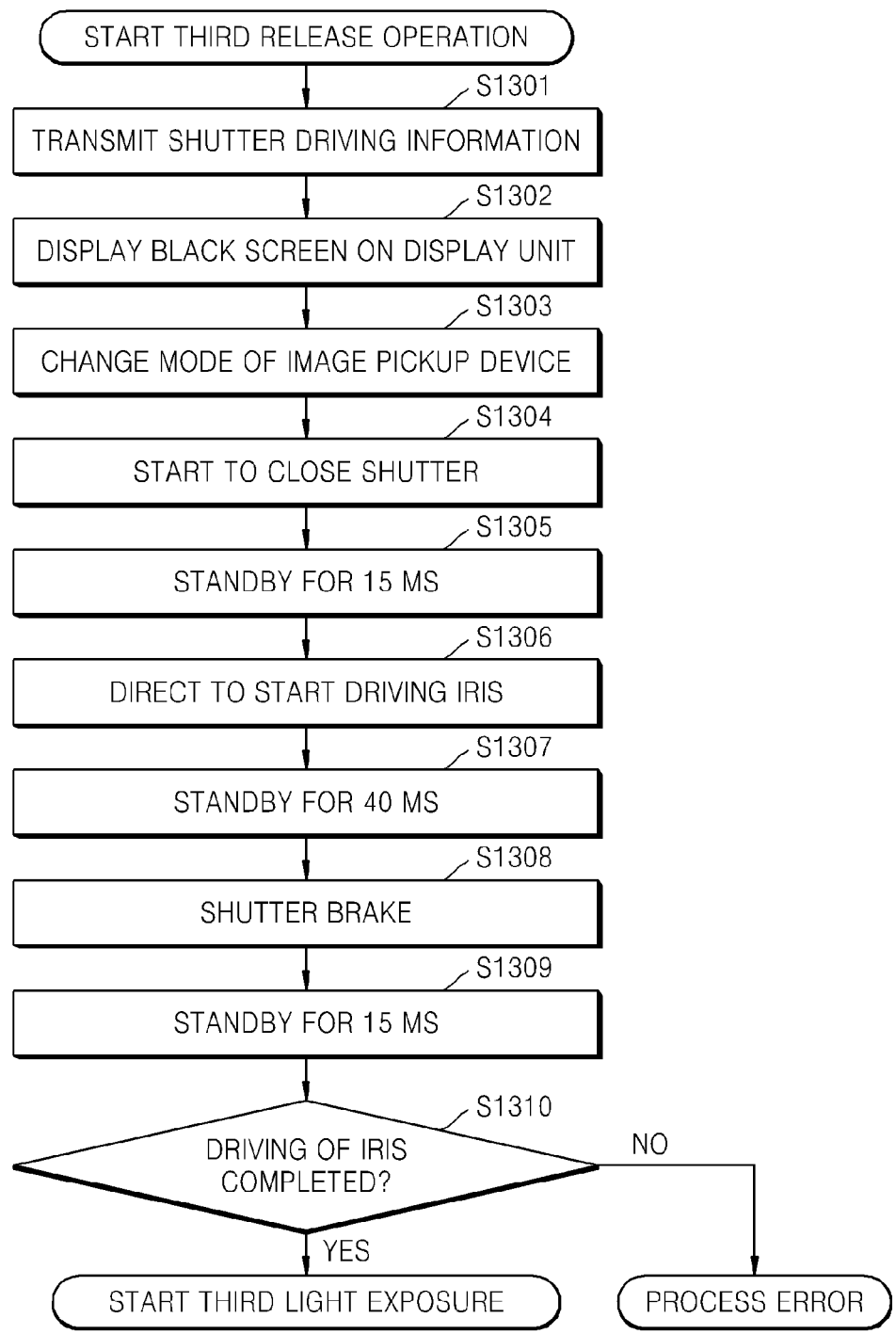
Figure 22:
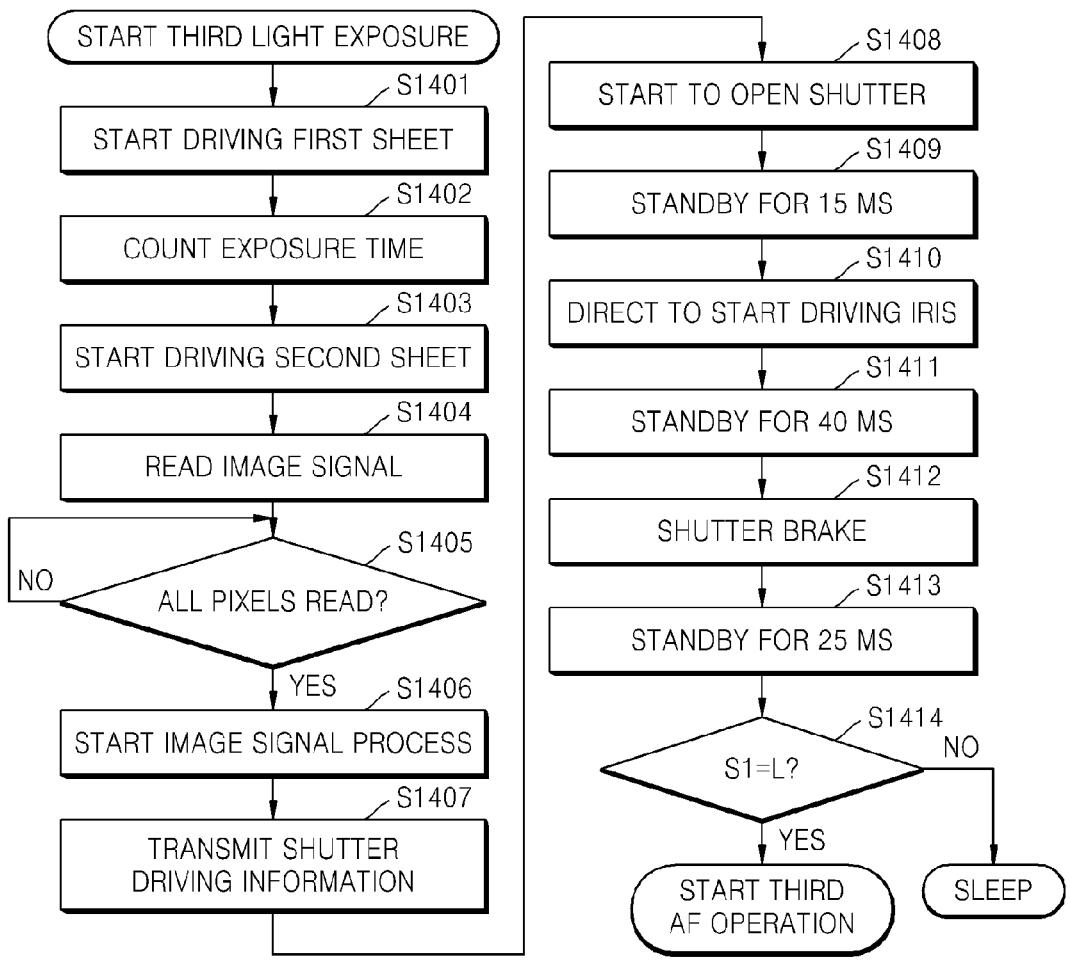
Figure 23:
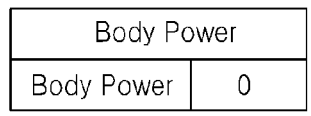
FIG. 23 is a table showing body data, according to an embodiment.

FIGS. 20, 21, and 22 are flowcharts illustrating a method of controlling the body unit 200 of the digital photographing apparatus 1, according to another embodiment. FIG. 23 is a table showing body data, according to an embodiment. In the current embodiment, body data including power supply information is transmitted from the body unit 200 to the lens 100, and the lens 100 determines driving of actuators included in the lens 100.

Referring to FIG. 20, the body unit 200 starts to perform an AF operation according to S1. First, the body unit 200 transmits body data including Body Power information about power supplied from the body unit 200 to the lens 100, to the lens 100 in operation S1201.

The table of FIG. 23 will now be described. Referring to FIG. 23, Body Power is shown as power supply information transmitted from the body unit 200 to the lens 100. When Body Power is 0, a maximum current supplied to the lens 100 is 2 A. When Body Power is 1, a maximum current supplied to the lens 100 is 2.5 A.

Referring back to FIG. 20, operations S1202 through S1209 are respectively identical to operations S501 through S508 of FIG. 13.

In operation S1209, if the iris 108 needs to be driven, the lens 100 is directed to drive the iris 108, in operation S1210. Alternatively, if it is determined that the digital photographing apparatus 1 is not in a pre-view mode in operation S1207 or it is determined that the iris 108 is not required to be driven in operation S1209, the iris 108 is not driven. As will be described later, if the lens 100 is performing the power zoom operation, the lens 100 determines the power supply information from the body unit 200 to determine the driving of the iris 108 during the power zoom operation.

Then, it is determined whether the release operation is requested to start as S2 is in a low level (L), in operation S1211. If the release operation is not requested to start, operation S1201 is performed. Alternatively, if the release operation is requested to start, the release operation is performed.

The method will now be described with reference to FIG. 21.

Referring to FIG. 21, shutter driving information indicating starting of driving the shutter 203 is first transmitted to the lens 100, in operation S1301. Operations S1302 through S1306 are respectively identical to operations S601 through S605 of FIG. 14.

After directing the lens 100 to drive the iris 108 in operation S1306, the digital photographing apparatus 1 stands by for about 40 ms in operation S1307, and the driving of the shutter 203 is ended to put on shutter brake in operation S1308. Then, the digital photographing apparatus 1 stands by for about 15 ms in operation S1309 to end the driving of the iris 108, and it is determined whether the driving of the iris 108 is completed in operation S1310.

If the driving of the iris 108 is not ended, it is determined that a mechanical error has been generated, and thus an error process is performed. If the driving of the iris 108 is ended normally, light exposure starts to be performed.

The method will now be described with reference to FIG. 22.

Referring to FIG. 22, operations S1401 through S1406 are respectively identical to operations S701 through S706 of FIG. 15 after starting the light exposure. After starting the image signal process in operation S1406, shutter driving information indicating driving of the shutter 203 is transmitted to the lens 100, in operation S1407. Also, the shutter 203 starts to be opened in operation S1408, the digital photographing apparatus stands by for about 15 ms in operation S1409, and then the iris 108 is directed to be driven in operation S1410.

Then, the digital photographing apparatus 1 stands by for about 40 ms in operation S1411 to end the driving of the shutter 203, thereby putting on a shutter brake on the shutter 203 in operation S1412. Then, the digital photographing apparatus 1 stands by for abut 25 ms again in operation S1413, and it is determined whether S1 is in a low level (L) in operation S1414. If S1 is in the low level, the AF operation starts again, and if S1 is in a high level, the digital photographing apparatus 1 is not manipulated, and thus enters a sleep mode.

In the current embodiment, the power consumption information may not be transmitted from the lens 100 to the body unit 200. Alternatively, Body Power information is transmitted from the body unit 200 to the lens 100 in operation S1201. Accordingly, the method of FIGS. 20, 21, and 22 does not require operations S509 and S512 of FIG. 13 and operation S707 of FIG. 15. Also, since the lens 100 determines whether the driving of the power zoom operation is permitted, operation S513 of FIG. 13, operation S607 of FIG. 14, operations S708 and S713 of FIG. 15 are not required.

FIGS. 24A, 24B, 25, and 26 are flowcharts illustrating a method of controlling the lens 100 of the digital photographing apparatus 1, according to another embodiment.

Figure 24A:
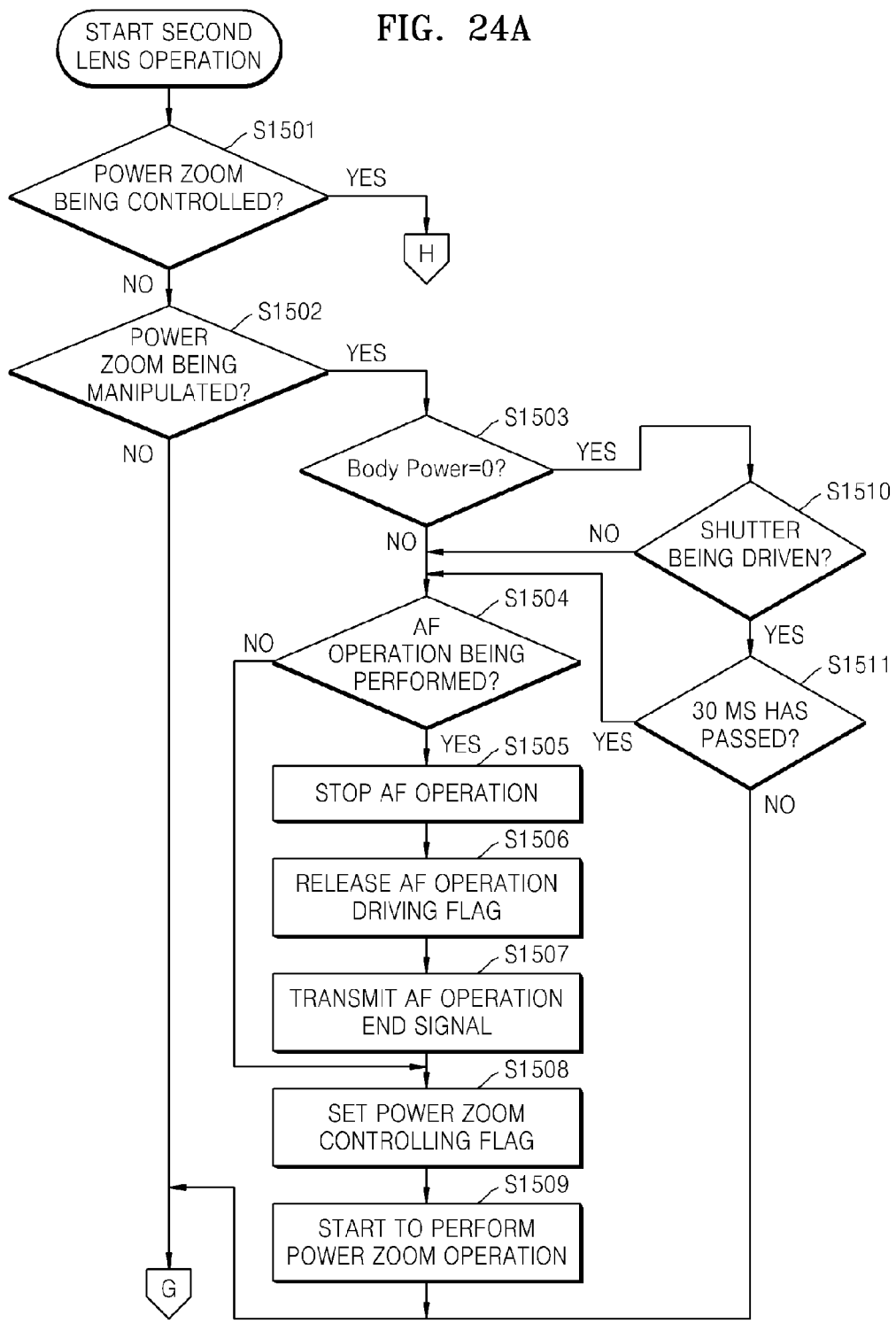
FIGS. 24A, 24B, 25, and 26 are flowcharts illustrating a method of controlling a lens of a digital photographing apparatus, according to another embodiment.
Figure 24B:
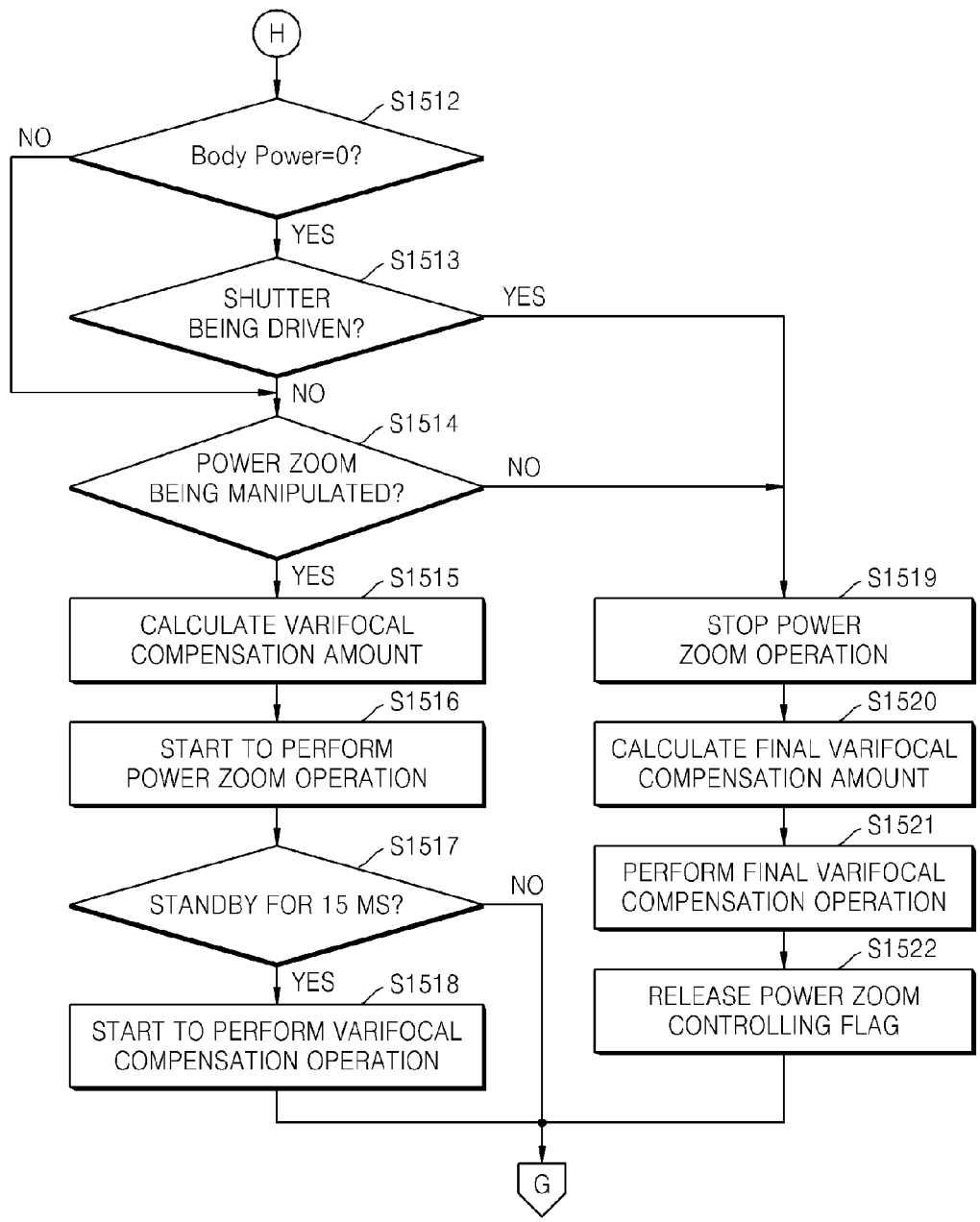

Referring to FIGS. 24A and 24B, when the lens 100 starts to be driven, it is first determined whether power zoom is being controlled in operation S1501. When a power zoom operation is not performed, it is determined whether power zoom is being manipulated in operation S1502.

If the power zoom is not manipulated, the method proceeds to operation G to perform a following operation.

If the power zoom is being manipulated, a size of a current supplied from the body unit 200 is determined by checking Body Power indicating power supply information from body data transmitted from the body unit 200, in operation S1503. For example, in operation S1503, it is determined whether the size of the current supplied from the body unit 200 is 2 A or 2.5 A as described above with reference to FIG. 23.

If Body Power is 1, i.e., if the size of the current is 2.5 A, operations S1504 through S1509 are performed. Operations S1504 through S1509 are respectively identical to S804 through S809 of FIG. 16A, and thus details thereof will be omitted herein.

Alternatively, if Body Power is determined to be 0 in operation S1503, i.e., if the size of the current is 2 A, it is determined whether the shutter 203 is being driven in operation S1510. If it is determined that the shutter 203 is not being driven in operation S1510 or if it is determined that 30 ms has passed after the shutter 203 is being driven in operation S1511, operation S1504 is performed.

Alternatively, if the shutter 203 is being driven and 30 ms has not passed, the method proceeds to operation G.

Alternatively, if it is determined that the power zoom is being controlled in operation S1501, it is determined whether Body Power is 0 in operation S1512. If Body Power is 0, it is determined whether shutter 203 is being driven in operation S1513. If the shutter 203 is being driven, the power zoom operation is stopped in operation S1519. A final varifocal compensation amount is calculated in operation S1520 at a location where the zoom lens 102 is stopped, and the focus lens 105 is driven to perform a final varifocal compensation operation in operation S1521. The power zoom controlling flag is released in operation S1522.

If Body Power is determined to be 1 in operation S1512 or it is determined that the shutter 203 is not being driven in operation S1513, it is determined whether a power zoom is currently being manipulated in operation S1514.

If the power zoom is being manipulated, the power zoom operation is continuously performed. Then, a varifocal compensation amount is calculated in operation S1515, and the power zoom operation starts to be performed in operation S1516. After starting to perform the power zoom operation, the digital photographing apparatus 1 stands by for about 15 ms in operation S1517, and after 15 ms has passed, a varifocal compensation operation starts to be performed in operation S1518. The varifocal compensation operation does not start before 15 ms has passed, thereby differentiating a point of time when the zoom lens 102 starts to be driven and a point of time when the focus lens 105 starts to be driven. Accordingly, a driving current is not repeatedly generated.

Accordingly, when Body Power is 1, i.e., when sufficient power is supplied from the body unit 200 to the lens 100, the power zoom operation may not be prohibited even when the shutter 203 is being driven.

Figure 25:
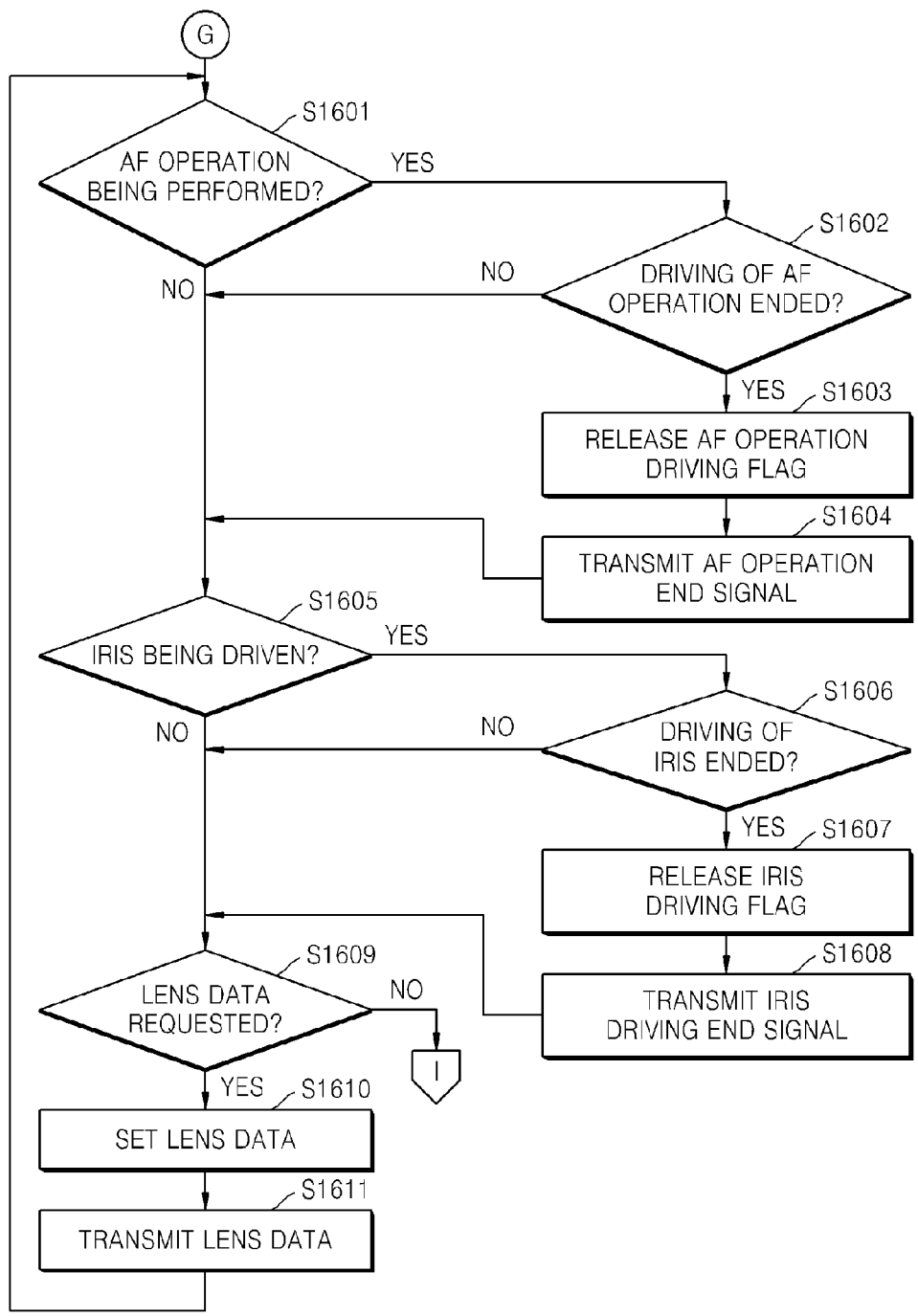

Since the method of FIG. 25 is identical to the method of FIG. 17, details about the method of FIG. 25 will be omitted herein.

The method will now be described with reference to FIG. 26.

Figure 26:
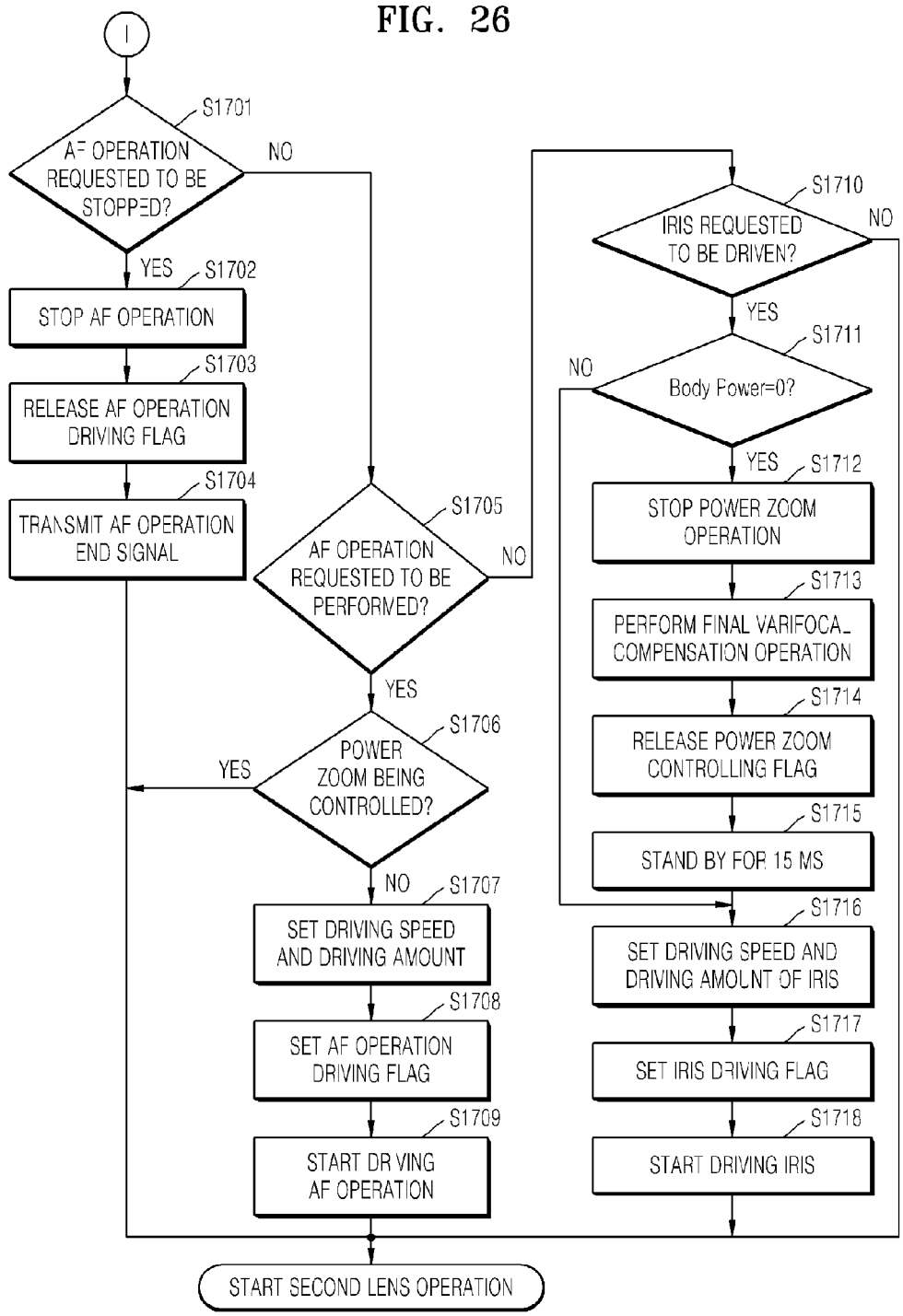

Operations S1701 through S1709 of FIG. 26 are respectively identical to operations S601 through S609 of FIG. 18.

If it is determined that the AF operation is not requested to be performed in operation S1705, it is determined whether the iris 108 is requested to be driven in operation S1710. If the iris 108 is requested to be driven, it is determined if Body Power is 0 in operation S1711.

If Body Power is 0, the power zoom operation is stopped in operation S1712, and a final varifocal compensation operation is performed in operation S1713. Then, a power zoom controlling flag is released in operation S1714, and the digital photographing apparatus stands by for about 15 ms in operation S1715.

After standing by for 15 ms, the driving speed and the driving amount of the iris 108 are set in operation S1716, an iris driving flag is set in operation S1717, and the iris 108 starts to be driven in operation S1718. Similarly, the method proceeds to operation S1716 to drive the iris 108 when Body Power is determined to be 1 in operation S1711.

Alternatively, if the iris 108 is not requested to be driven in operation S1710, the lens 100 starts to be driven again.

In the above embodiment, the body data including the power supply information is transmitted from the body unit 200 to the lens 100, and the lens 100 controls driving of the actuators included in the lens 100 based on the power supply information.

As such, the actuators included in the lens 100 may be stably controlled as the lens 100 determines a method of driving the actuators based on the power supply information received from the body unit 200, i.e., whether to drive the actuators simultaneously or sequentially, or whether to prohibit the driving of the actuators.

Figure 27:
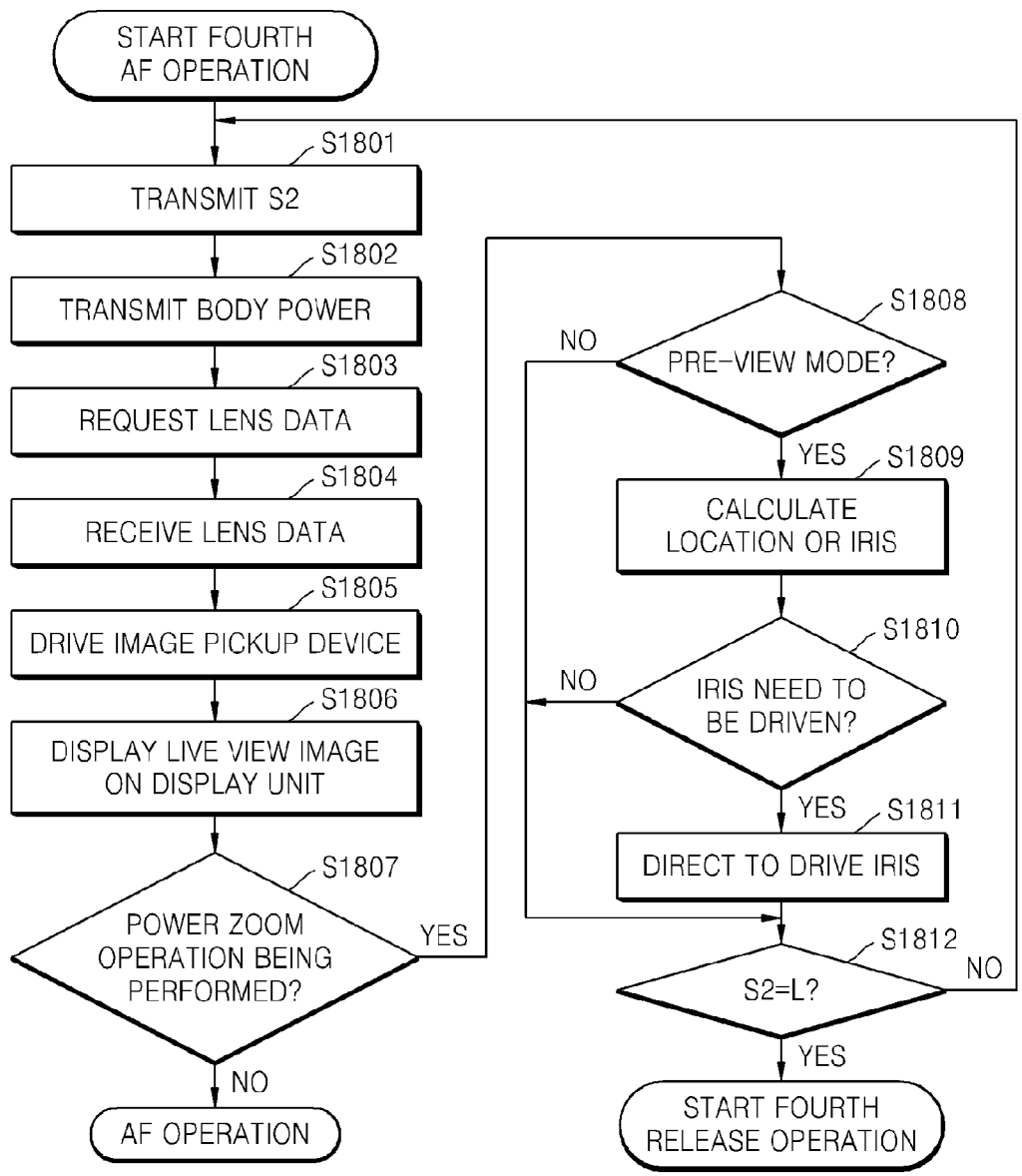
FIGS. 27, 28, and 29 are flowcharts illustrating a method of controlling a body unit of a digital photographing apparatus, according to another embodiment.
Figure 28:
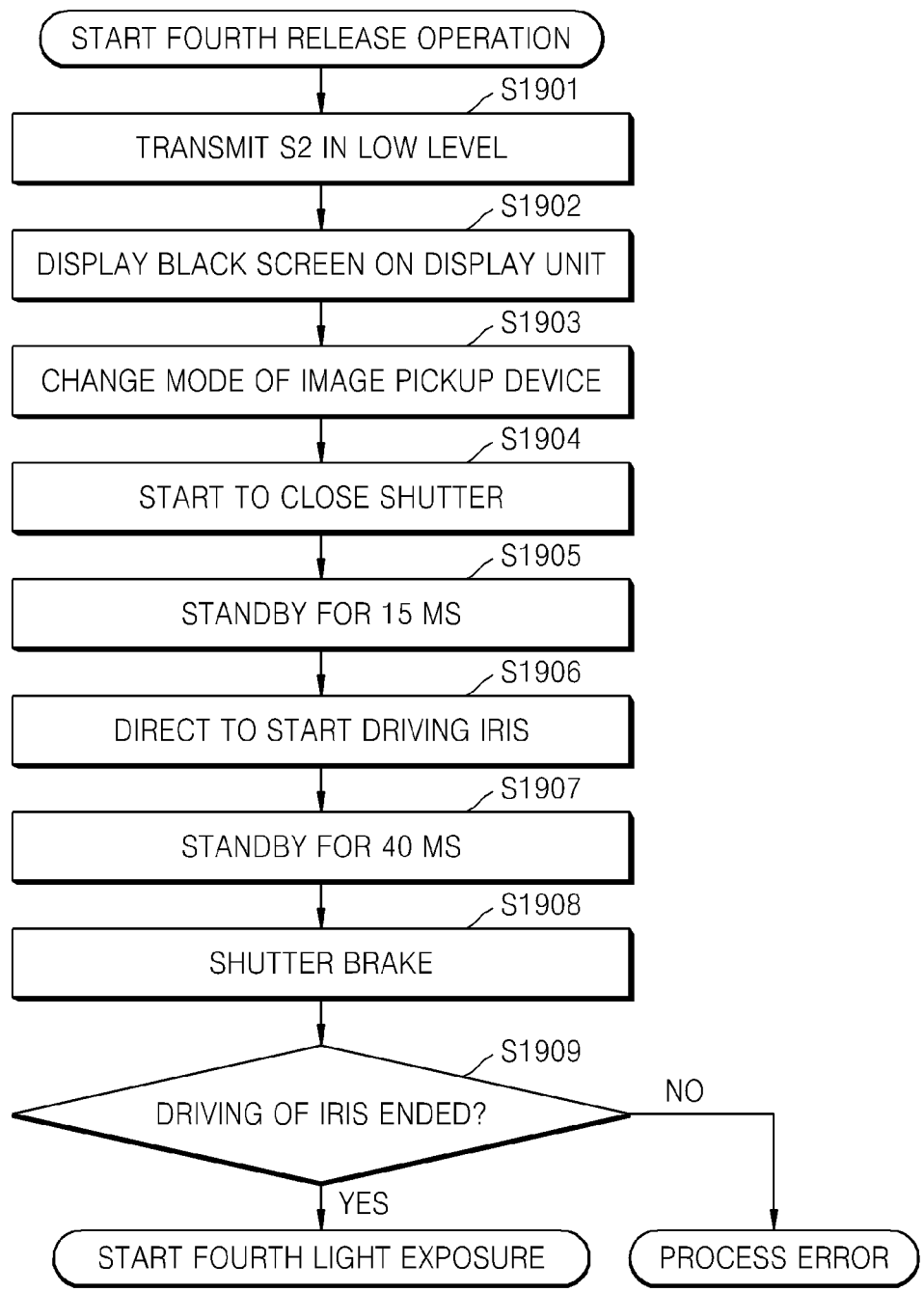
Figure 29:
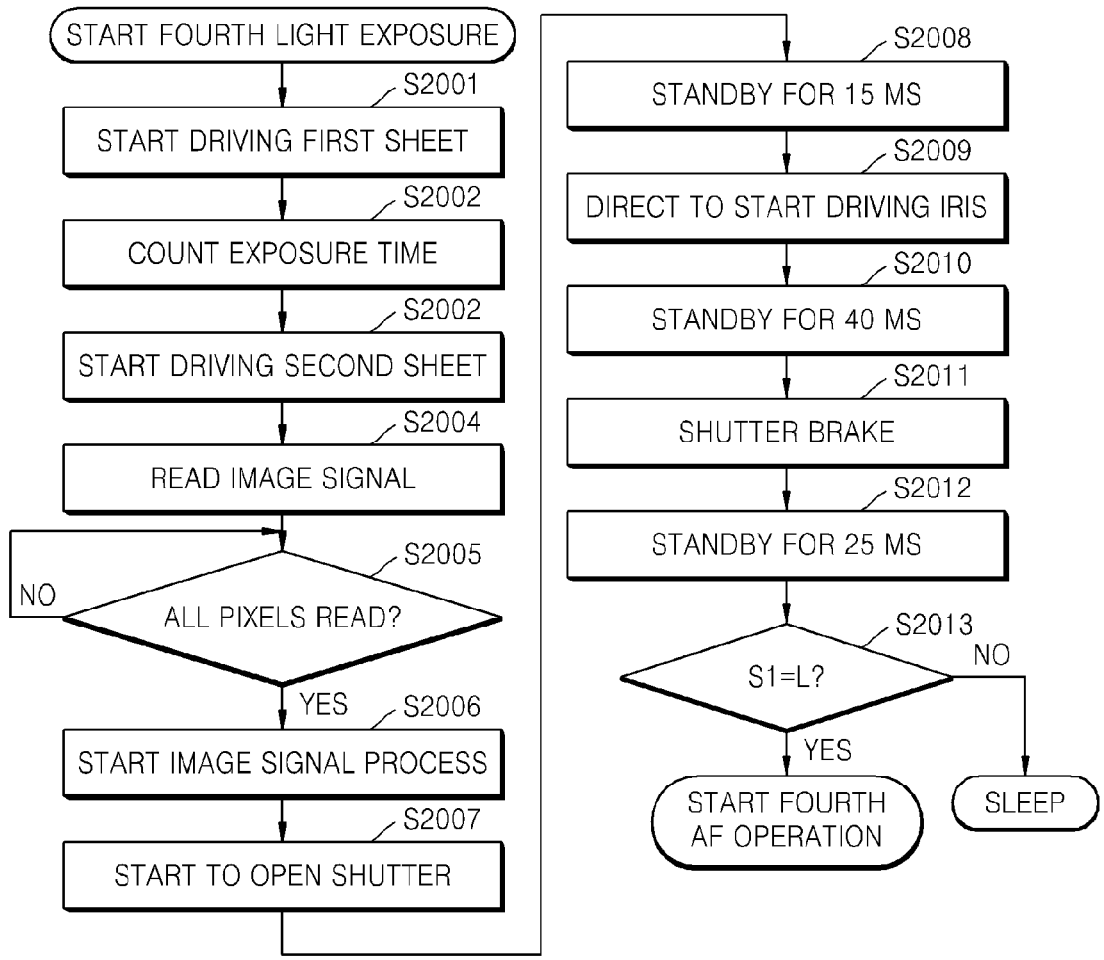

FIGS. 27, 28, and 29 are flowcharts illustrating a method of controlling the body unit 200 of a digital photographing apparatus 1, according to another embodiment.

In the current embodiment, body data including power supply information is transmitted from the body unit 200 to the lens 100, and the lens 100 determines driving of actuators included in the lens 100. Since the method of FIGS. 27 through 29 is almost identical to the method of FIGS. 20 through 22, only differences thereof will be mainly described.

Referring to FIG. 27, when an AF operation starts, S2 is transmitted to the lens 100 in operation S1801. Operations S1802 through S1812 are respectively identical to operations S1201 through S1211 of FIG. 20.

Referring to FIG. 28, when a release operation starts, a signal indicating that S2 is in a low level (L) is transmitted to the lens 100 in operation S1901. Operations S1902 through S1908 are respectively identical to operations S1302 through S1308 of FIG. 21. After putting on the shutter brake in operation S1908, it is determined whether the driving of the iris 108 is completed in operation S1909 as in operation S1310 of FIG. 21.

The method of FIG. 29 is identical to the method of FIG. 22, except that operation S1407 of FIG. 22 is not performed in the method of FIG. 29.

Figure 30A:
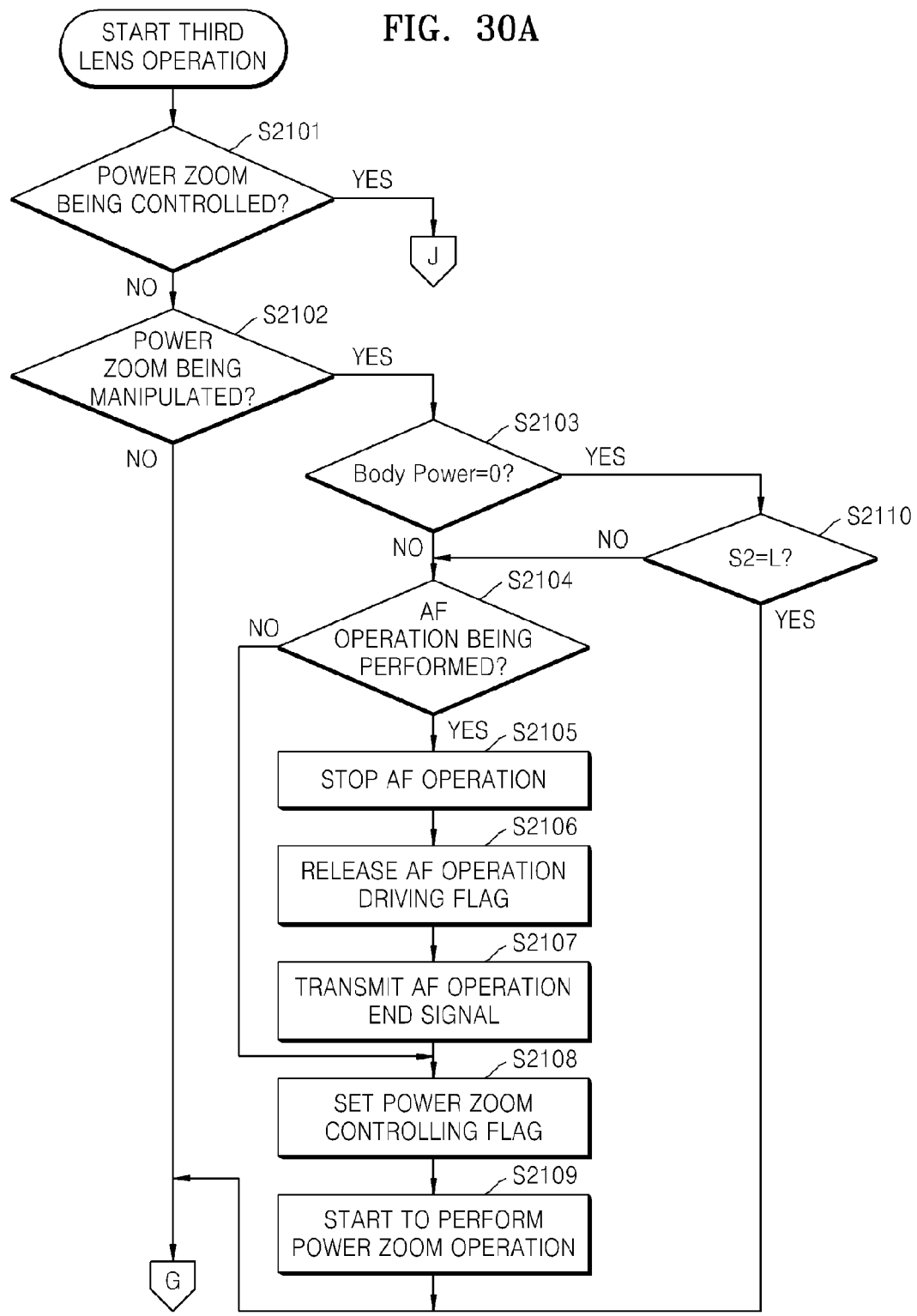
FIGS. 30A, 30B, and 31 are flowcharts illustrating a method of controlling a lens of a digital photographing apparatus, according to another embodiment.
Figure 30B:
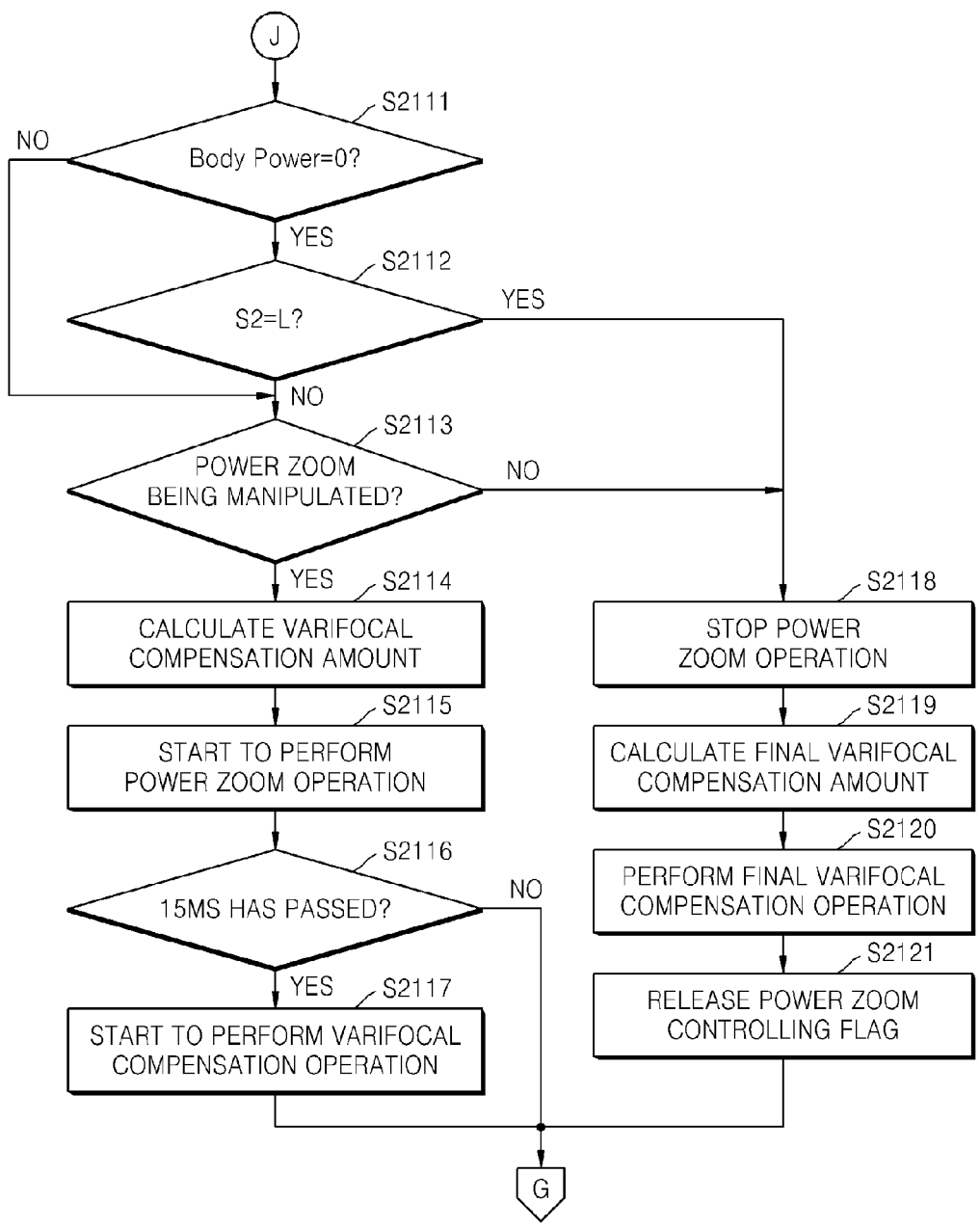
Figure 31:
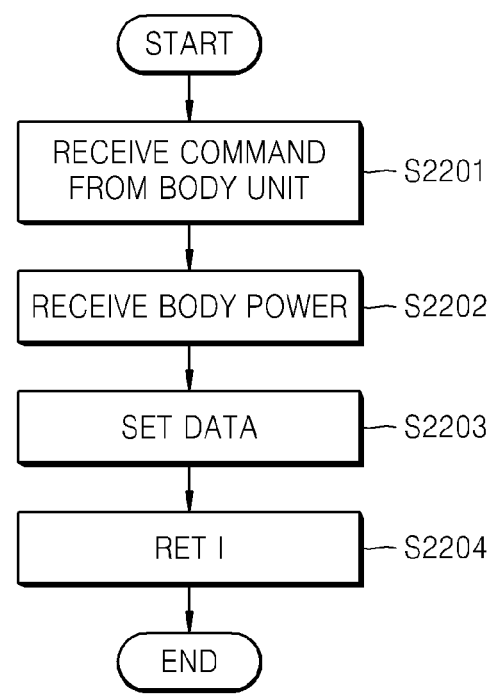

FIGS. 30A, 30B, and 31 are flowcharts illustrating a method of controlling the lens 100 of the digital photographing apparatus 1, according to another embodiment. Since the method of FIGS. 30A and 30B is almost identical to the method of FIGS. 24A and 24B, only differences thereof will be mainly described.

In operations S1510 and S1511 of FIG. 24A, the lens 100 prohibits power zoom operation for about 30 ms from a point of time when the shutter 203 starts to be driven, if the shutter 203 is being driven and Body Power is 0 by referring to the shutter driving information. Also, in operation S1513 of FIG. 24B, the power zoom operation is stopped while the shutter 203 is being driven during the power zoom operation.

In the current embodiment, referring to FIGS. 30A and 30B, the power zoom operation is prohibited when Body Power is 0 in operation S2103 and S2 is in a low level (L) in operation S2110. Alternatively, the power zoom operation is prohibited when Body Power is 0 in operation S2111 and S2 is in the low level (L) in operation S2112 during the power zoom operation.

Other than the above descriptions, the method of FIGS. 30A and 30B are identical to the method of FIGS. 24A and 24B.

Also, operations after operation G in FIGS. 30A and 30B are identical to those of FIGS. 25 and 26, except that instead of starting the second lens operation as at the end of FIG. 26, the current embodiment starts the third lens operation of FIGS. 30A and 30B.

The method will now be described with reference to FIG. 31.

In FIG. 31, body data is received from the body unit 200. An interrupt process is performed on the body data from the body unit 200 according to an update request from the body unit 200.

The lens 100 receives a command from the body unit 200 in operation S2201, and the body data including Body Power constituting power supply information is received in operation S2202. The body data is set according to the command received according to an interrupt process in operation S2203. After the data is set, the lens 100 returns from an interrupt process loop (returns from an interrupt routine (RETI)), in operation S2204.

In the above embodiment, the body data including the power supply information is transmitted from the body unit 200 to the lens 100, and the lens 100 controls the driving of the actuators included in the lens 100 based on the power supply information.

As such, the actuators included in the lens 100 may be stably controlled as the lens 100 determines a method of driving the actuators based on the power supply information received from the body unit 200, i.e., whether to drive the actuators simultaneously or sequentially, or whether to prohibit the driving of the actuators.

As described above, according to embodiments, a plurality of actuators included in an exchangeable lens can be stably controlled.

While describing the embodiments, the values of driving time and driving amount are only examples, and may vary.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A digital photographing apparatus comprising:
an exchangeable lens comprising in the exchangeable lens a plurality of actuators and a storage unit that stores power consumption information related to driving of the plurality of actuators; and
a body unit to which the exchangeable lens is installed, and comprising an actuator controller in the body unit that controls the driving of the plurality of actuators based on the power consumption information;
wherein the plurality of actuators comprise a zoom lens driving actuator;
the body unit further comprises a shutter button that directs starting of a release operation; and
the actuator controller determines stopping of the zoom lens driving actuator according to power consumption information of the zoom lens driving actuator, if the release operation is requested to start while driving of the zoom lens driving actuator.

2. The digital photographing apparatus of claim 1, wherein the actuator controller permits the driving of the plurality of actuators if the power consumption information is below a base value.

3. The digital photographing apparatus of claim 1, wherein the actuator controller prohibits two or more actuators from among the plurality of actuators from being simultaneously driven if the power consumption information is equal to or above a base value.

4. The digital photographing apparatus of claim 1, wherein the plurality of actuators comprise a zoom lens driving actuator, a focus lens driving actuator, and an iris driving actuator, and
the actuator controller prohibits driving of the zoom lens driving actuator while the shutter button is being manipulated, if the power consumption information is equal to or above a base value.

5. The digital photographing apparatus of claim 1, wherein the plurality of actuators comprise at least one of a zoom lens driving actuator, a focus lens driving actuator, and an iris driving actuator.

6. The digital photographing apparatus of claim 1, wherein the exchangeable lens further comprises a communicator that transmits the power consumption information to the actuator controller.

7. A digital photographing apparatus comprising:
an exchangeable lens comprising in the exchangeable lens a plurality of actuators and an actuator controller that controls driving of the plurality of actuators; and
a body unit to which the exchangeable lens is installed, and the body unit comprising a storage unit in the body unit that stores power supply information supplied to the exchangeable lens,
wherein the actuator controller controls the driving of the plurality of actuators based on the power supply information;
the plurality of actuators comprise a zoom lens driving actuator;
the body unit further comprises a shutter button that directs starting of a release operation; and
the actuator controller determines stopping of the zoom lens driving actuator according to power consumption information of the zoom lens driving actuator, if the release operation is requested to start while driving of the zoom lens driving actuator.

8. The digital photographing apparatus of claim 7, wherein the actuator controller permits the driving of the plurality of actuators if the power supply information is equal to or above a base value.

9. The digital photographing apparatus of claim 7, wherein the actuator controller prohibits two or more actuators from among the plurality of actuators from being simultaneously driven if the power supply information is below a base value.

10. The digital photographing apparatus of claim 7, wherein the plurality of actuators comprise a zoom lens driving actuator, a focus lens driving actuator, and an iris driving actuator,
and
the actuator controller prohibits driving of the zoom lens driving actuator while the shutter button is being manipulated, if the power consumption information is below a base value.

11. The digital photographing apparatus of claim 7, wherein the plurality of actuators comprise at least one of a zoom lens driving actuator, a focus lens driving actuator, and an iris driving actuator.

12. The digital photographing apparatus of claim 7, wherein the body unit further comprises a communicator that transmits the power supply information to the actuator controller.

13. A digital photographing apparatus comprising:
a plurality of actuators;
a first storage unit that stores power consumption information related to driving of the plurality of actuators;
a power controller that supplies power to the plurality of actuators;
a second storage unit that stores power supply information related to power supplied to the plurality of actuators;
an actuator controller that controls the driving of the plurality of actuators based on the power consumption information and the power supply information; and
an exchangeable lens and a body unit to which the exchangeable lens is installed;
wherein the exchangeable lens comprises in the exchangeable lens the plurality of actuators and the first storage unit,
the body unit comprises in the body unit the power controller, the second storage unit, and the actuator controller;
the plurality of actuators comprise a zoom lens driving actuator,
the body unit further comprises a shutter button that directs starting of a release operation, and
the actuator controller determines stopping of the zoom lens driving actuator according to power consumption information of the zoom lens driving actuator, if the release operation is requested to start while driving of the zoom lens driving actuator.

14. The digital photographing apparatus of claim 13, wherein the actuator controller permits driving of the plurality of actuators if the power consumption information is below power supply information.

15. The digital photographing apparatus of claim 13, wherein the actuator controller prohibits two or more actuators from among the plurality of actuators from being simultaneously driven if the power consumption information is equal to or above the power supply information.

16. The digital photographing apparatus of claim 13, wherein the plurality of actuators comprise a zoom lens driving actuator, a focus lens driving actuator, and an iris driving actuator, and the actuator controller prohibits driving of the zoom lens driving actuator while the shutter button is being manipulated, if the power consumption information is equal to or above the power supply information.

\* \* \* \* \*